United States Patent
Mergard et al.

(10) Patent No.: US 6,401,156 B1
(45) Date of Patent: Jun. 4, 2002

(54) FLEXIBLE PC/AT-COMPATIBLE MICROCONTROLLER

(75) Inventors: James O. Mergard, Pflugerville; James R. Magro, Austin; Michael S. Quimby, Austin; Pratik M. Mehta, Austin, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,456

(22) Filed: Aug. 23, 1999

(51) Int. Cl.$^7$ .............................................. G06F 13/24
(52) U.S. Cl. ...................... 710/266; 710/300; 710/260
(58) Field of Search ............................... 710/260–266, 710/300

(56) References Cited

U.S. PATENT DOCUMENTS 4,438,492 A * 3/1984 Harmon, Jr. et al.
6,163,826 A * 12/2000 Khan et al. ................ 710/107

OTHER PUBLICATIONS

Direct Memory Access (DMA) Channels, Charles M. Kozierok, The PC Guide, <http://www.pcguide.com/ref/mbsys/res/dma/index–c.html>, ©1997–1999, 1 pg.
DMA Channel Function and Operation, Charles M. Kozierok, The PC Guide <http://www.pcguide.com/ref/mbsys/res/dma/func–c.html>, ©1997–1999, 4 pgs.
DMA Channels Details By Number, Charles M. Kozierok, The PC Guide, <http://www.pcguide.com/ref/mbsys/res/dma/num–c.html>, ©1997–1999, 5 pgs.
*Elan™SC400 and Elan410 Microcontrollers User's Manual*, Advanced Micro Devices, Inc., ©1997, pp. 10–1 through 10–10.
*The Indepensible PC Hardware Book*, Hans–Peter Messmer, Third Ed., ©1997, table of contents and pp. 449–475, 521–547, 557–628, 636–649, and 659–751.
*ISA System Architecture*, Tom Shanley & Don Anderson, 1995 table of contents and pp. 29–37, 107–111, and 334–475.
*82C37A–5 CHMOS High Performance Programmable DMA Controller*, Intel Corporation, Sep. 1988, pp. 5–4 through 5–14.
*82C54 CHMOS Programmable Interval Timer*, Intel Corporation, Sep. 1993, pp. 5–24 through 5–29.
*82C59A–2 CHMOS Programmable Interrupt Controller*, Intel Corparation, Oct. 1988, pp. 5–45 through 5–52.
*ELAN™ SC400 and Elan SC410 Single–Chip*, Low–Power, PC/AT–Compatible Microcontrollers, Data Sheet, Advanced Micro Devices, Inc., Dec. 1998, pp. 1 through 132.
*The Elan™ SC410 Microcontroller*, Product Brief, Advanced Micro Devices, Inc., ©1999, 3 pages, http://www.amd.com/products/lpd/elan410/21328a.html.

* cited by examiner

Primary Examiner—Rupal Dharia
(74) Attorney, Agent, or Firm—Akin, Gump, Strauss, Hauer & Feld LLP

(57) ABSTRACT

A microcontroller for PC/AT-compatible or non-PC/AT compatible embedded environments is disclosed. The microcontroller includes a general purpose bus which may emulate an ISA bus in a PC/AT-compatible mode. PC/AT-compatible DMA channels, interrupt controllers, programmable timers, a real-time clock, processor, and a flexible memory and an I/O mapping scheme are provided by the microcontroller. The programmable timers, interrupt controllers, DMA channels and I/O mapping can be configured for a PC/AT-compatible mode or a non-PC/AT-compatible mode. In particular, the plurality of interrupt controllers are configured such that some are enabled during PC/AT-compatible operation while the remainder are disabled. The microcontroller further embeds several PC/AT peripheral devices and yet maintains the flexibility to support external devices if desired by the embedded system designer. Other PC/AT-compatible features are also supported by the microcontroller.

18 Claims, 19 Drawing Sheets interrupt control register ─ 167

| bit | 7 | 6 | 5 | 4 | 3 | 2 | 1 | 0 |
|---|---|---|---|---|---|---|---|---|
| | NMI done | NMI enable | reserved | | | slave 2 global interrupt mode enable | slave 1 global interrupt mode enable | master global interrupt mode enable |
| reset | 0 | 0 | 0 | | | 0 | 0 | 0 |
| R/W | R/W | W | R/W | | | R/W | R/W | R/W |

FLEXIBLE PC/AT-COMPATIBLE MICROCONTROLLER

BACKGROUND OF THE INVENTION

1. Field of the Invention

This application relates to microcontroller architecture, and more particularly to a flexible microcontroller which is PC/AT-compatible.

2. Description of the Related Art

When IBM produced its first personal computer, the product was named a "PC." PCs quickly became very popular, and companies started developing hardware and software products to support the PC. By 1984, when IBM announced its PC/AT, a standard by which companies developed PC-based products had been defined.

PC/AT compatibility is a standard with no true specification. Instead, the rapid growth of the personal computer industry around the PC/AT machine helped to define the standard. Manufacturers of PC/AT-compatible computers were unable to change this standard because of the huge installed base of software and hardware built for the original PC. Even IBM was helpless to change a standard they helped to create.

Fifteen years later, PC/AT-compatible computers are still being manufactured and sold. Although somewhat amorphous, the PC/AT compatibility standard may nevertheless be defined according to a few key components. At a software level, PC/AT compatibility implies that a computer is able to run DOS and Windows®. These programs require a computer to include very particular hardware and firmware, however.

First, a main processor, an Intel 8088 or compatible microprocessor, sits at the heart of a PC/AT-compatible system. Essentially, the purpose of the microprocessor is to read instructions from memory and perform the operations specified by the instructions. The operations that may be performed include internal operations such as executing math functions, reading data from external devices, or writing data to external devices.

Thus, to fulfill its purpose, the microprocessor in a computer is typically coupled to a memory and one or more external devices, known as peripheral devices. The coupling of memory and the peripheral devices to the microprocessor is achieved using one or more buses. An ISA bus, short for Industry Standard Architecture, connects one or more peripheral devices to the microprocessor and the memory of a PC/AT-compatible computer.

Other ISA bus features are commonly found in PC/AT computers. The ISA bus supports a 16 Mb memory address space as well as a 1 Mb I/O address space. The ISA bus also supports 8-bit and 16-bit data widths. Further, dynamic sizing of the ISA bus is possible in PC/AT-compatible systems.

In order for the devices to communicate, a computer system includes one or more clock signals. The clock(s) enable the various devices to synchronize to one another so that the devices may properly communicate. Further, in a PC/AT-compatible computer system, a set of interval timers provides a programmable frequency source for hardware and software to exploit.

Coupled to the microprocessor by the ISA or other buses, peripheral devices may from time to time required service from the microprocessor. In a PC/AT-compatible architecture, peripheral devices use interrupt request lines to obtain the attention of the microprocessor. Logic which arbitrates between multiple interrupt requests to the microprocessor in a particular manner is also part of a PC/AT-compatible system.

For transfers between the peripheral devices and the memory, a PC/AT-compatible system includes logic known as direct memory access, or DMA. DMA provides the capability for transfers to be made between peripheral devices and memory while the processor is executing instructions. A PC/AT-compatible system has particular requirements for how DMA channels are configured and organized. For example, the PC/AT supports fly-by DMA transfers only between memory and I/O devices. Memory-to-memory DMA transfers are not supported.

The ISA bus further supports dynamic cycle timing control using a pin known as IOCHRDY. Also, typically by including an ISA connector, DMA channels and IRQs are provided external to the PC/AT-compatible computer, so that external devices may communicate with the microprocessor and memory.

Another feature of PC/AT-compatible systems is the presence of a real-time clock, or RTC, and CMOS, a type of low power memory. The RTC and CMOS RAM are connected to a battery such that when the system is powered down, stored information contained in CMOS is retained.

I/O address mapping is fixed in PC/AT-compatible systems, and some PC/AT cards expect address aliasing because only 10 of the 16 available address bits are decoded. Standard PC/AT peripheral devices are direct-mapped in an I/O space from 0000h to 03FFh.

A PC/AT-compatible system includes a particular mapping of its memory, known commonly as dynamic random access memory, or DRAM. DRAM is typically addressed in a linear fashion staring at 00000000h and ending at the top of DRAM. Such systems also include a read-only memory, or ROM, which typically includes firmware which performs a power-on self test, or POST, when the computer is first turned on. Further, all PC/AT-compatible systems include firmware known as basic input output system or BIOS. (Without the BIOS in the ROM, DOS and Windows® would not run.) The BIOS provides programs, known as software interrupts, which enable an operating system and application programs to interact with peripheral devices, such as floppy and fixed disk drives, without having to address the hardware directly.

In a PC/AT-compatible system, the BIOS ROMs are mapped over the normal DRAM space. Thus, a windowing mechanism is required to redirect accesses to these spaces out to the ISA bus to access the ROM. Further, to support system management mode (SMM), which is common in many PC/AT computers today, an additional overlay DRAM region, accessible only to the processor, is provided. Additionally, several regions below the top of memory are decoded to support BIOS, expansion ROMs, and a video buffer. To recover these regions, typical PC/AT systems "shadow" these regions (i.e., copy the ROM contents to DRAM) for faster execution.

During system initialization, or POST, instructions are executed by the microprocessor. Because PC/AT-compatible systems are flexible enough to permit system expansion, POST typically includes programs to detect when new hardware has been added to the computer. For example, one of the requirements of POST is to determine the size of memory. Because of the vast array of DRAM types and speeds that are commercially available, a PC/AT-compatible system provides a mechanism to allow POST to determine the type of memory which populates the computer.

In addition to the ISA bus, most PC/AT-compatible systems today include a high performance peripheral component interconnect, or PCI, bus. In particular, PCI buses are favored for connecting a video subsystem to the computer. For those PC/AT-compatible systems which implement a PCI bus, a PCI host bridge coupled between the processor bus and the PCI bus maintains a mirror image of the current DRAM size configuration register in order to properly respond to a PCI access. Having this information in the PCI host bridge has permitted targets on the PCI bus to react more quickly to a request.

SUMMARY OF THE INVENTION

Briefly, the illustrative system provides a microcontroller with the flexibility to provide a PC/AT-compatible or non-PC/AT-compatible embedded environment. The microcontroller includes an 8088-compatible processor and a processor bus. Coupled to the processor bus, a DRAM controller and a ROM controller provide for external DRAM and ROMs to be connected to the microcontroller.

The microcontroller includes a general purpose bus which may emulate an ISA bus for PC/AT compatibility. Further, the microcontroller includes DMA channels, interrupt controllers, programmable timers, and a flexible I/O mapping scheme, all of which conform to PC/AT compatibility requirements. Further, the microcontroller includes a real-time clock and programmable address mapping.

Several PC/AT peripheral devices are embedded in the microcontroller of the illustrative system. These include 8259-compatible programmable interrupt controllers, or PICs, an 8254-compatible programmable interval timer, and 8237-compatible direct memory access controllers. Certain PICs of the microcontroller are disabled while other PICs are enabled to provide a PC/AT-compatible environment. Further, an MC146818-compatible real-time clock is embedded in the microcontroller.

The flexible memory mapping of the microcontroller facilitates the creation of a system memory map which is PC/AT-compatible. Provisions for DOS "holes" for BIOS shadowing and for PCI bus requirements are readily available using this feature.

The microcontroller also provides PC/AT-compatible processor reset function. Further, support for system control ports A and B, NMI generation, A20 gate commands, and DOS-compatible FPU error reporting are possible using this microcontroller. Finally, a dedicated pin is provided for connection to an external clock if so desired. The microcontroller can be configured for a PC/AT-compatible mode or a non-PC/AT-compatible mode.

BRIEF DESCRIPTION OF THE DRAWINGS

A better understanding of the illustrative system can be obtained when the following detailed description of the disclosed embodiment is considered in conjunction with the following drawings, in which:

FIG. 5 is a block diagram of one register of an exemplary microcontroller according to one embodiment;

DETAILED DESCRIPTION OF PREFERRED EMBODIMENT

The following related patent applications are hereby incorporated by reference as if set forth in their entirety:

U.S. patent application, bearing Ser. No. 09/379,160, entitled FLEXIBLE MICROCONTROLLER ARCHITECTURE, filed concurrently;

U.S. patent application, bearing Ser. No. 09/379,457, entitled BUFFER CHAINING, filed concurrently;

U.S. patent application, bearing Ser. No. 09/379,015, entitled METHOD AND APPARATUS FOR OVERLAPPING PROGRAMMABLE ADDRESS REGION, filed concurrently;

U.S. patent application, bearing Ser. No. 09/379,012, entitled GENERAL PURPOSE BUS WITH PROGRAMMABLE TIMING, filed concurrently;

U.S. patent application, bearing Ser. No. 09/378,873, entitled DIRECT MEMORY ACCESS CHANNEL CONFIGURABILITY SUPPORT, filed concurrently;

U.S. patent application, bearing Ser. No. 09/379,020, entitled FLEXIBLE ADDRESS PROGRAMMING WITH WRAP BLOCKING, filed concurrently; and U.S. patent application, bearing Ser. No. 09/379,019, entitled REDIRECTING I/O ADDRESS HOLES, filed concurrently.

Figure 1:
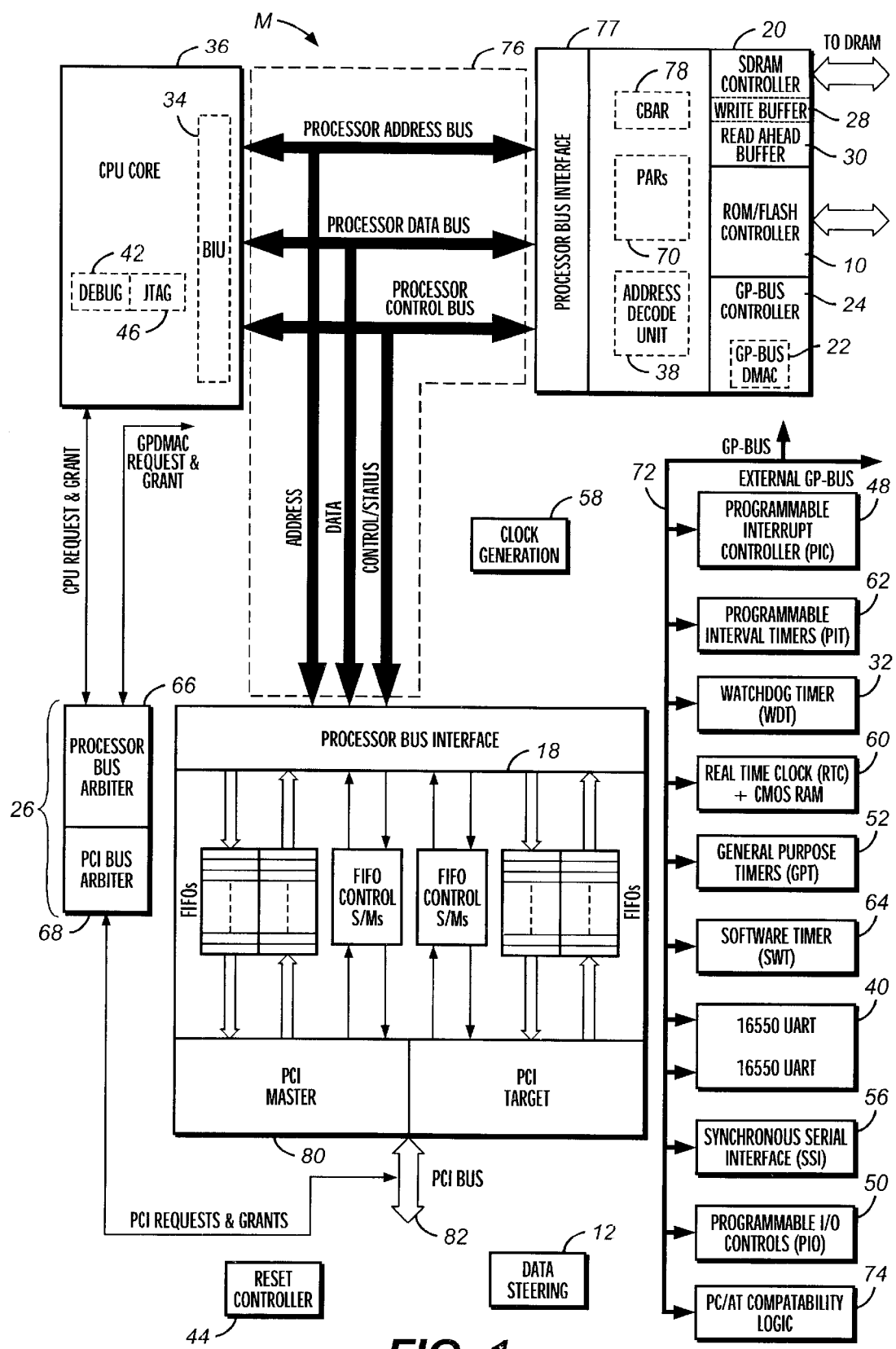
FIG. 1 is a block diagram of some elements of an exemplary microcontroller according to one embodiment.

Turning now to the drawings, FIG. 1 shows a typical microcontroller M in accordance with the present invention.

The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability and write protection for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36 and PCI master controller 80, and external bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, a general purpose bus DMAC 22 and the PCI host bridge 18 on behalf of an external bus master requesting access to DRAM. The PCI bus arbiter 68 may arbitrate between five possible PCI masters.

A processor bus interface 77 is responsible for DMA cache snooping, dynamic clock speed adjusting, dynamic bus sizing, ready signal consolidation, Memory Mapped Configuration Region (MMCR) control and general purpose address control. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and supports up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (AMDebug) core 42 provides an integrated debug interface for embedded hardware/software debug during a special debug mode, AMDebug mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable AMDebug mode after the CPU 36 has been reset.

An integrated ROM/Flash controller 100 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5 M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
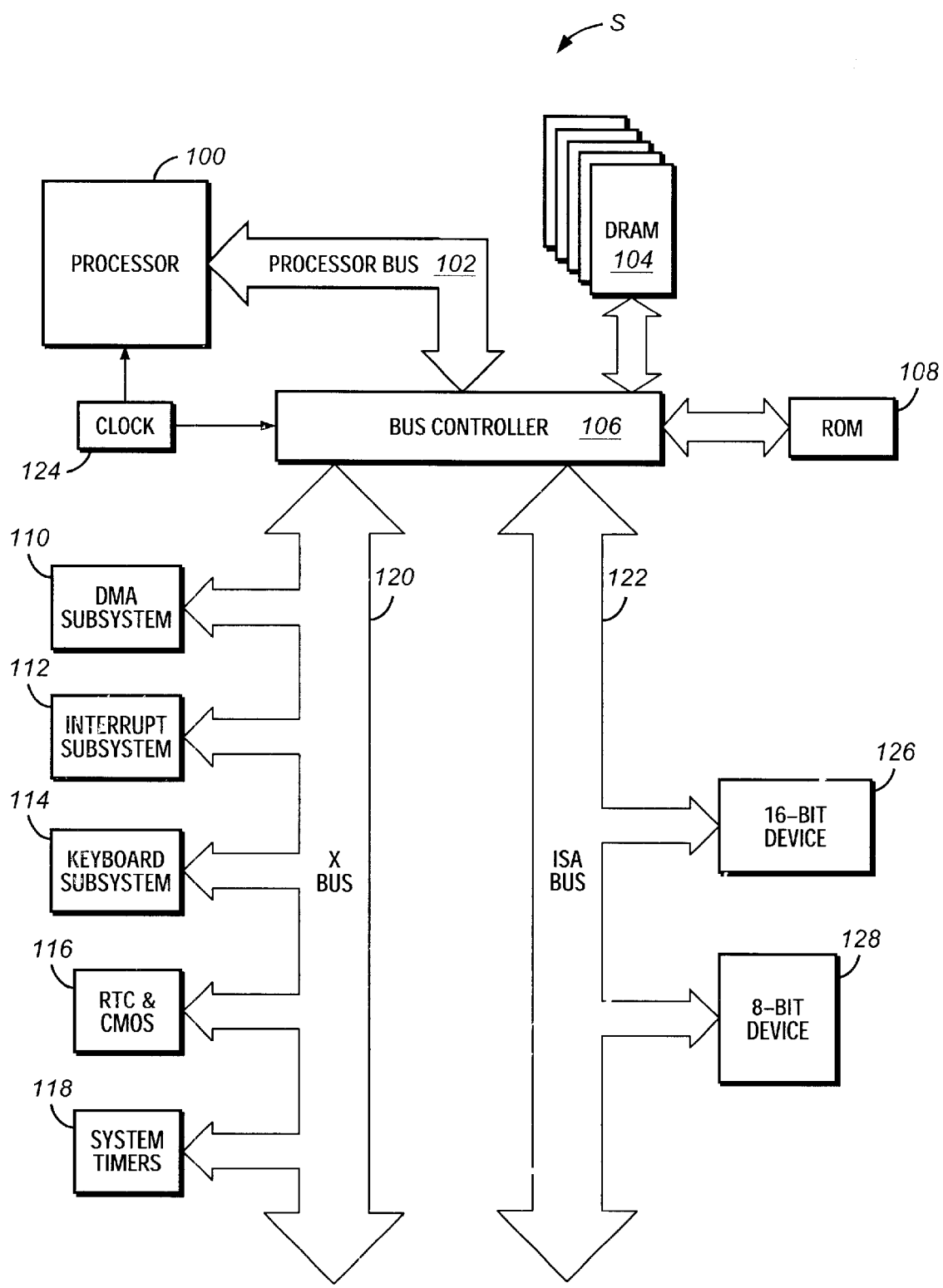
FIG. 2 is a detailed block diagram of the circuitry of the programmable interrupt controller of the microcontroller of the illustrative system according to one embodiment.

Before discussing the PC/AT-compatible features of the microcontroller M of FIG. 1, a brief introduction to PC/AT-compatibility is provided. FIG. 2 is a block diagram of a computer system S used to illustrate some of the basic hardware features of a PC/AT-compatible computer. First, a processor 100, also known as a microprocessor, is shown. PC/AT-compatible systems are based upon the Intel 8088 or compatible microprocessors. The 8086, 80286, 80386, 80486, and Pentium microprocessors are all considered PC/AT-compatible with the 8088 microprocessor.

FIG. 2 also shows a processor bus 102. The processor bus 102 connects the processor 100 to the other components of the computer system S and provides a pathway for address, data, and control signals to traverse. Also shown coupled to the processor bus 102 is a memory or DRAM 104. The DRAM 104 contains data such as, for example, instructions that the processor 100 executes.

Next, a bus controller 106 coupled to the processor bus 102 is shown. The bus controller 106 contains logic which enables the processor 100 to communicate with external devices. A ROM device 108 is shown coupled to the bus controller 106. The ROM 108 contains firmware instructions which are executed by the processor 100 when the computer system S is powered up.

A clock 124 is also shown as input to both the processor 100 and the bus controller 106. The clock 124 enables synchronization of these and other devices so that the processor 100 can communicate with other devices in the computer system S.

FIG. 2 shows two peripheral buses, an X bus 120 and an ISA bus 122. The X bus 120 is simply a buffered version of the ISA bus 122. As shown in FIG. 2, several components of PC/AT-compatible systems are connected to the system through the X bus 120. These components include a DMA subsystem 110, an interrupt subsystem 112, a keyboard subsystem 114, a real-time clock and CMOS RAM subsystem 116, and system timers 118.

Also shown as part of the computer system S is an ISA bus 122. ISA is an acronym for Industry Standard Architecture. Accordingly, the ISA bus 122 is a standard component of all PC/AT-compatible systems. The ISA bus 122 has several features, many of which are discussed below. A general function of the ISA bus 122 is to provide a mechanism for 8- or 16-bit devices to be added to the computer system S such that the devices may interact with its other circuitry. For example, an external device may need to interrupt the processor 100. Accordingly, the device needs to interact with the interrupt subsystem 112. Adherence to ISA bus 122 requirements makes such interaction possible. FIG. 2 shows a 16-bit device 126 and an 8-bit device 128 connected to the ISA bus 122. These devices may be either soldered on the system board or they may be connected via an ISA expansion slot connector. An example of an 8-bit device is a floppy disk drive controller while a fixed disk drive controller is a commonly used 16-bit device. Both are typically found in PC/AT systems.

The following sections describe particular requirements and implementations for PC/AT compatibility of the microcontroller M. For simplicity and clarity, requirements which are common across most computer system architectures are not described herein. Thus, for example, no mention is made of chip select signals, except where pertinent to discussing particular architectural requirements of a PC/AT-compatible system.

Programmable Interrupt Controller (PIC)

PC/AT Compatibility Requirements

In the PC/AT world, all hardware interrupts to a processor are channeled through two interrupt controllers. The interrupt controllers are Intel 8259A or their equivalent devices. The PC/AT architecture supports two cascaded 8259A PICs for a total of fifteen maskable interrupt request sources. The interrupt controllers are eight-input devices that can accept interrupt signals from several devices, assign priorities to each interrupt, and then interrupt the processor. Upon receipt of the interrupt, the processor automatically reads the particular interrupt controller to determine the source of the highest priority interrupt. Once determined, the processor calls the appropriate software interrupt routine.

Two interrupt controllers, a master and a slave, are used so that fifteen levels of interrupts are available. The INTR output of the slave is connected to the IR2 input of the master. This configuration enables the slave interrupt controller to interrupt the master interrupt controller to cause an interrupt. Although not required, typical PC/AT systems implement additional logic to allow programmable steering of the IRQs. The programmable interrupt controllers provide other features which are well-known to PC/AT system designers.

Figure 3:
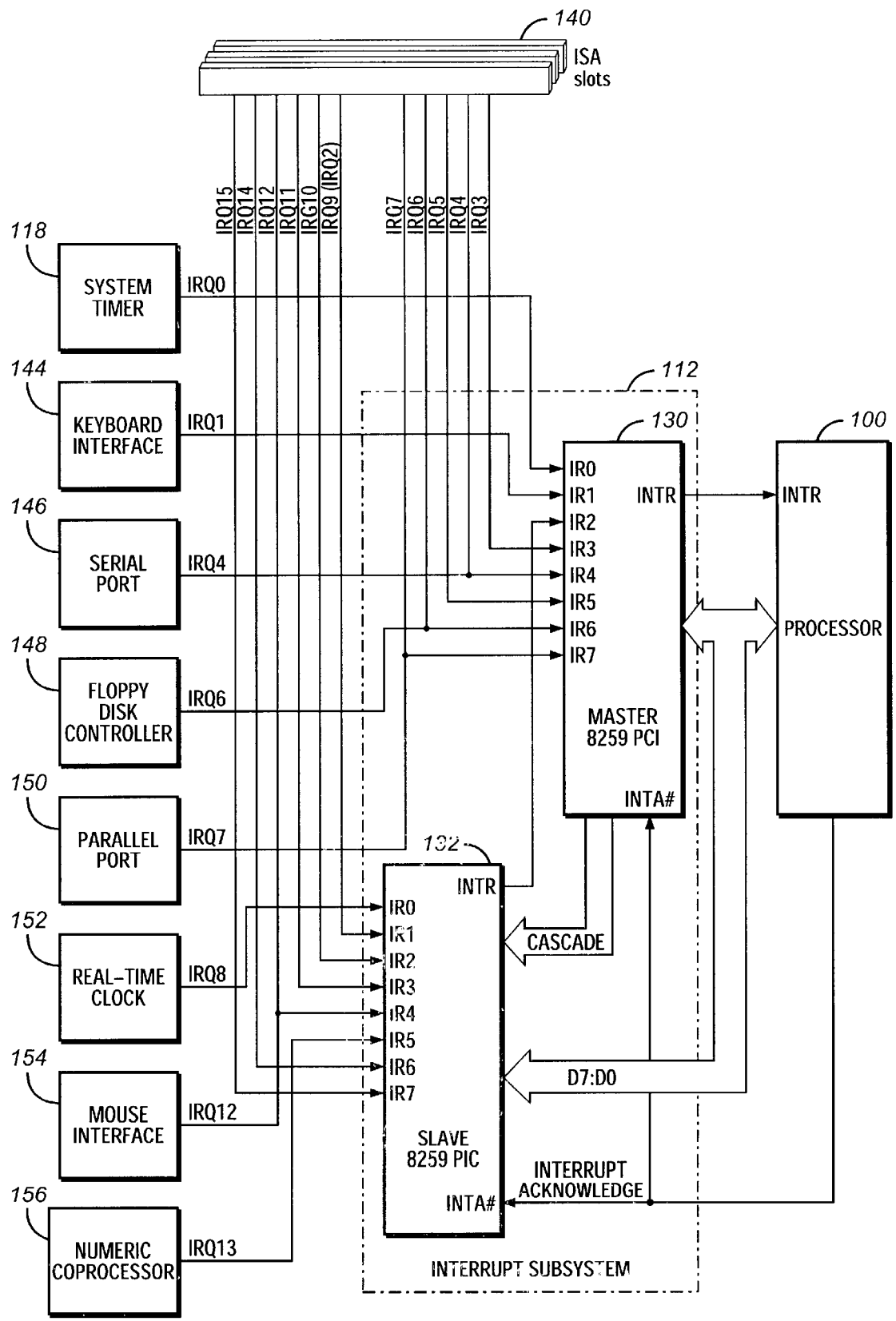
FIG. 3 is a block diagram illustrating the interrupt subsystem for a typical PC/AT computer system.

FIG. 3 is a block diagram illustrating the interrupt subsystem 112 for the PC/AT-compatible system introduced in FIG. 2. The interrupt subsystem 112 consist of two interrupt controllers: a master PIC 130 and a slave PIC 132. Together, the two PICs 130 and 132 receive interrupts from a variety of resources in the system S. The eight interrupts coming in from the slave PIC 132 produce a single INTR signal which in this case goes to the IR2 line of the master PIC 130, as FIG. 3 shows. In a PC/AT-compatible system, the interrupt priorities are assigned in ascending order. That is, IR0 has a higher priority than IR1 and IR2, and so on. Because the eight interrupts from the slave PIC 132 interrupt the IR2 line of the master PIC 130, all eight of the slave interrupts have higher priority than IR3 through IR7 of the master PIC 130.

As FIG. 3 shows, the interrupt inputs are labeled IRQ0 through IRQ15, for a total of sixteen interrupts for the two PICs 130 and 132. However, the INTR output from the slave PIC 132 is an input to IR2 of the master PIC 130. Therefore, only fifteen IRQ interrupts are available. In PC/AT-compatible systems, the fifteen available interrupts are assigned to particular logic of the computer system S.

In PC/AT-compatible systems, the IRQ0 is received from a system timer 118, as FIG. 3 shows. IRQ1 is provided by a keyboard interface 144. IRQ2 is cascaded from the slave controller 132. IRQ3 and IRQ4 are each assigned to a serial port in PC/AT-compatible systems. In FIG. 3, however, the IRQ3 and IRQ4 inputs are shown tied to ISA slots 140. The ISA slots 140 permit one or more external serial cards to be connected to the computer system S. The serial card(s) may then be assigned the IRQ3 or IRQ4 inputs to the master interrupt controller 130, as desired. The IRQ4 input is also shown connected to a serial port 146. An integrated serial port 146 is generally a part of a PC/AT-compatible system.

Next, the IRQ5 input is received from the ISA slots 140. IRQ5 is reserved in PC/AT-compatible systems for connection to a parallel port. The IRQ6 input is received from a floppy disk controller 148. Like IRQ4, the IRQ6 input is also connected to the ISA slots 140, allowing for an external floppy disk controller to be connected to the computer system S as desired. The IRQ7 input is from a parallel port 150. Again, the IRQ7 line is also connected to the ISA slots 140 for expandable options.

The next eight interrupts, IRQ8 through IRQ15 are inputs to the slave PIC controller 132. First, the IRQ8 input is received from a real-time clock 152. IRQs 9, 10, 11, 14 and 15 are all shown coming in from the ISA slots 140. These interrupts can be coupled to any 8- or 16-bit ISA devices.

In PC/AT-compatible systems, the IRQ12 input is received from a mouse interface 154 while the IRQ13 input is received from a numeric co-processor 156. Thus, FIG. 3 is an illustrative representation of how the fifteen available interrupts into both the master and slave interrupt controllers 130 and 132 are organized in PC/AT-compatible systems.

Exemplary Implementation

The microcontroller M of the illustrative system provides a highly programmable architecture which grants its customers the option to enable PC/AT functionality. The microcontroller M provides three 8259A programmable interrupt controllers. The PICs for the microcontroller M can be configured as either a stand-alone master controller, one slave cascade, or cascading with both slave controllers. The flexible architecture thus provides embedded system designers the ability to utilize the twenty-two interrupts available using the three 8259A PICs, to program two of the PICs for PC/AT functionality, or to disable both slaves, leaving only eight available interrupts, as desired.

Figure 4:
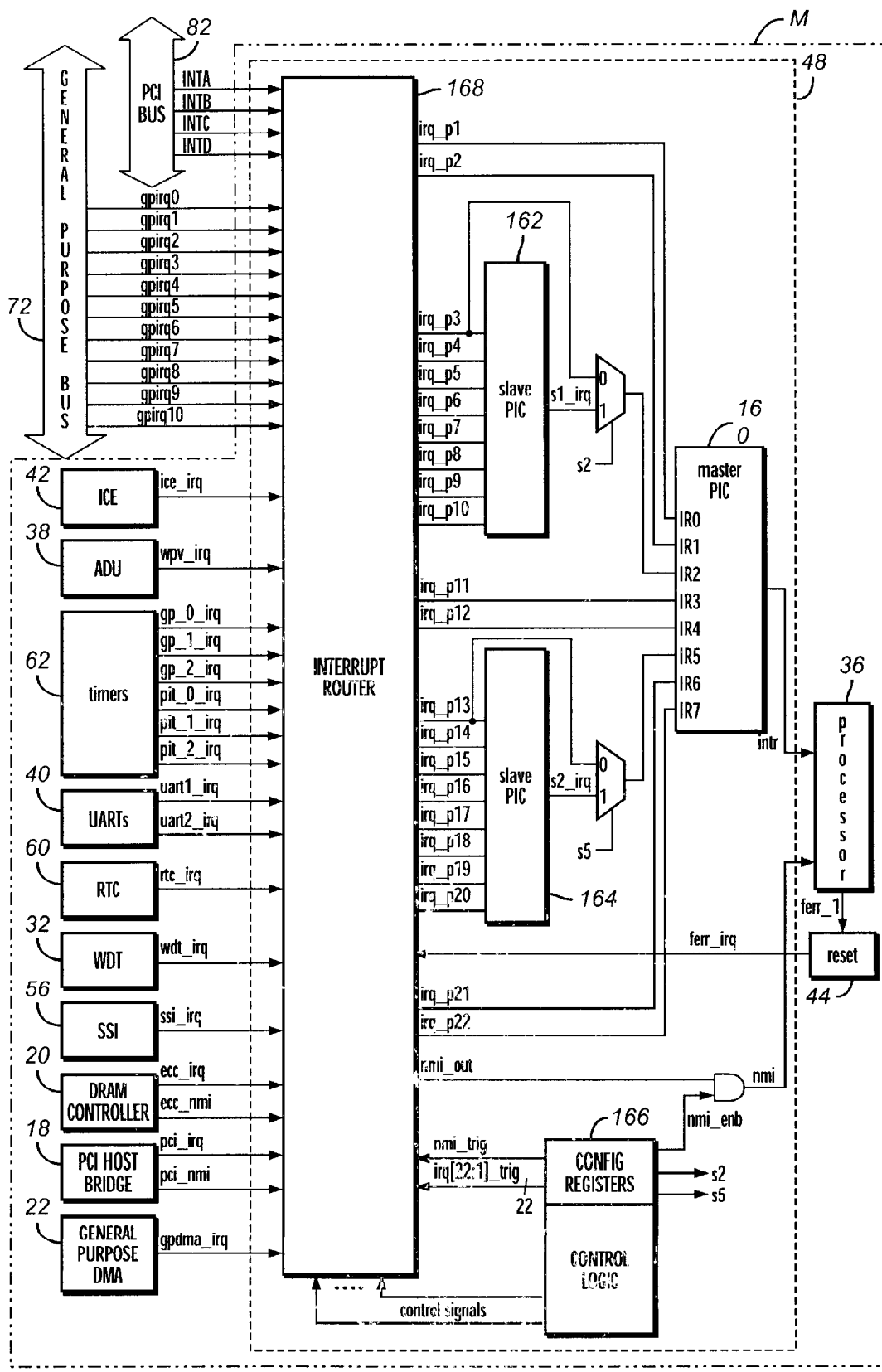
FIG. 4 is a block diagram illustrating the interrupt subsystem for an exemplary microcontroller according to one embodiment.

FIG. 4 is a block diagram of the programmable interrupt controller 48 introduced in FIG. 1 as part of the microcontroller M. The PIC 48 consists of three industry standard programmable interrupt controllers integrated together with a highly programmable interrupt router. Accordingly, FIG. 4 shows a master PIC 160, a slave PIC 162, a second slave PIC 164, and an interrupt router 168. The two industry standard PICs 162 and 164 are cascaded as slaves to the master PIC 160. The master PIC 160 arbitrates interrupt requests from various sources to the CPU 36. The programmable interrupt router 168 handles routing of the various external and internal interrupt sources to the twenty-two interrupt channels of the three PICs 160, 162 and 164.

The interrupt router 168 may receive interrupts from either sources external to the microcontroller M or those internal to the microcontroller M. The external sources include devices connected to the PCI bus 82 or the general purpose bus 72. Additionally, the interrupt router 168 may receive interrupts from internal sources including the AMDeug 42, the address decode unit 38, the programmable interval timers 62, the UARTs 40, the real-time clock 60, the watchdog timer 32, the synchronous serial interface 56, the DRAM controller 20, the PCI host bridge 18, and the general purpose DMA controller 22.

TABLE 1

PC/AT interrupt channel assignment for the microcontroller M

| IRQ No. | I/O device | microcontroller M interrupt source |
|---|---|---|
| IRQ0 | System Timer0 | Internal via pit_0_irq |
| IRQ1 | Keyboard Interface | External via General Purpose IRQ pin |
| IRQ2 | Slave1 cascading | Cascaded from Slave Controller |
| IRQ3 | Serial Port 2 | Internal via uart2_irq |
| IRQ4 | Serial Port 1 | Internal via uart1_irq |
| IRQ5 | Parallel Port 2 | External via General Purpose IRQ pin |
| IRQ6 | Floppy Disk Controller | External via General Purpose IRQ pin |
| IRQ7 | Parallel Port 1 | External via General Purpose IRQ pin |
| IRQ8 | Real Time Clock | Internal via rtc_irq |
| IRQ9 | Any 8 or 16 bit ISA device | External via General Purpose IRQ pin |
| IRQ10 | Any 8 or 16 bit ISA device | External via General Purpose IRQ pin |
| IRQ11 | Any 8 or 16 bit ISA device | External via General Purpose IRQ pin |
| IRQ12 | Mouse Interface | External via General Purpose IRQ pin |
| IRQ13 | Numeric Co-processor | Internal via ferr_irq |
| IRQ14 | Any 8- or 16-bit ISA device | External via General Purpose IRQ pin |
| IRQ15 | Any 8- or 16-bit ISA device | External via General Purpose IRQ pin |

The PIC 48 of the microcontroller M is designed to support PC/AT compatibility. In this respect, the programmable interrupt router 168 may be configured at startup to appropriately route ISA interrupt signals to the corresponding interrupt channels of the slave PICs 162 and 164 and the master PIC 160. Table 1 shows the interrupt channel assignment for PC/AT-compatible systems and the corresponding interrupt of the microcontroller M. These channel assignments are implemented in software, typically during BIOS initialization.

Also shown in FIG. 4 is a set of configuration registers 166 coupled to the interrupt router 168. The configuration registers 166 control the PIC 48 of the microcontroller M. The configuration registers 166 include both memory-mapped and direct-mapped registers. The memory-mapped registers of the PIC 48 are mapped into the memory-mapped configuration register space of the microcontroller M. Among other functions, these registers control the interrupt mapping for both the internal peripheral sources listed above and for external sources connected to the buses 72 and 82. The direct-mapped registers are accessible in the PC/AT I/O address space. Refer to Table 4, below, for particular I/O port assignments for a PC/AT-compatible system.

FIG. 5 is a block diagram of one of the memory-mapped registers of the microcontroller M known as an interrupt control register 167. The bottom three bits control the global interrupt mode enable feature for each of the master 160, the slave 162, and the slave 164. For example, if bit 0 of the interrupt control register 167 is set, the global interrupt mode for the master PIC 162 is enabled. For PC/AT compatibility, bits 1 and 0 of the interrupt control register 167 are set, while bit 2 is cleared.

The PIC 48 includes a set of configuration registers 166, as shown in FIG. 4. These registers include an interrupt request register, in-service registers, and four initialization control words. A set of such registers is available for each controller 160, 162, and 164. These are direct-mapped registers assigned to I/O ports 20h–21h for the master PIC 160, 24h–25h for the slave PIC 164, and 0A0h–0A1h for the slave PIC 162 of the microcontroller M. The I/O port assignments for the master PIC 160 and the slave PIC 162 for the microcontroller M correspond to the I/O port assignments required for PC/AT compatibility.

The initialization of the PIC 48 consists of writing a sequence of two to four bytes to each of the master PIC 160, the slave PIC 162, and the slave PIC 164. The first initialization byte is written to the lower address of each interrupt controller (020h for the master 160, 0A0h for the slave 164, and 024h for the slave 162). All subsequent initialization bytes are written to the upper address of the interrupt controllers (021h for the master 160, 0A1h for the slave 164, and 025h for the slave 162). Hardware programmers of ordinary skill will recognize this programming sequence as preferred for 8259 and 8259-compatible interrupt controllers.

TABLE 2

Configuring the PIC 48 of the microcontroller M

| in general | PC/AT-compatible system | PC/AT programming example |
| --- | --- | --- |
| for master 160, slave 162, and slave 164: | for master 160 and slave 162: | (master 160 uses I/O 20h and 21h slave 162 uses I/O A0h and A1h) |
| 1. initialize ICW1 | ICW1[1] = 0b | 20h = 11h<br>A0h = 11h |
| 2. initialize ICW2 with vector offset value | master ICW2 = 08h<br>slave ICW2 = 70h | 21h = 08h<br>A1h = 70h |

TABLE 2-continued

Configuring the PIC 48 of the microcontroller M

| in general | PC/AT-compatible system | PC/AT programming example |
| --- | --- | --- |
| 3. initialize ICW3 if ICW1 was set for cascading PICs | ICW3[2] = 1b<br>ICW3[5] = 0b | 21h = 04h<br>A1h = 02h |
| 4. initialize ICW4 only if ICW1 provides for | ICW4[1] = 0b<br>ICW4[4] = 0b | 21h = 01h<br>A1h = 01h |

Table 2 shows how the PIC 48 of the microcontroller M may be configured for either a PC/AT-compatible system or for a non-PC/AT-compatible system. Up to four initialization control words, denoted ICW1, ICW2, ICW3, and ICW4, may be programmed for each of the master controller 160, the slave controller 162, and the second slave controller 164.

First, the ICW1 register is initialized. This initialization byte notifies the relevant PIC (master 160, slave 162, or slave 164) that an initialization sequence is commencing. The ICW1 register also controls the type of interrupt triggering (edge- or level-sensitive), whether or not the relevant PIC 160, 162, or 164 is in a cascaded environment or alone, and whether the fourth initialization byte (ICW4) is required. For PC/AT-compatible interrupt control, bit 1 of the ICW1 is set to a zero. Accordingly, the third column of Table 2 shows programming examples for programming the ICW1 register for both the master 160 and one slave 164.

Next, the ICW2 register is initialized. This register contains the vector offset for the relevant PIC 160, 162 or 164. For PC/AT-compatible systems, the ICW2 register for the master PIC 160 contains an 08h while the ICW2 register for the slave PIC 162 contains a 70h, as Table 2 shows. Third, the ICW3 register is initialized. The ICW3 register is initialized only if the ICW1 register was programmed to cascade one or more interrupt controllers. Programming the ICW3 register identifies which IR inputs of the master PIC 160 are hooked up to the slave PICs 162 and 164. Looking back to FIG. 4, the slave PIC 162 is input to the master PIC 160 at IR2. The slave PIC 164 is input to the master PIC 160 at IR5. Thus, in a PC/AT-compatible implementation of the microcontroller M, bit 2 of the ICW3 register is set while bit 5 of the ICW3 register is cleared, since a single slave PIC 162 is sufficient for PC/AT compatibility.

Next, Table 2 shows that the ICW4 register is initialized. The ICW4 register configures the relevant PIC for special fully nested mode, buffered mode, automatic end of interrupt mode, and microprocessor mode.

In addition to the registers shown in Table 2, an interrupt control register, one of the many memory-mapped registers of the microcontroller M, is programmed for PC/AT compatibility by setting bits 1 and 0 of the register. These bits enable all of the interrupts for the master 160 and the slave 162.

Thus, the PIC 48 of the microcontroller M allows embedded system designers to program the PIC 48 for PC/AT compatibility. Alternatively, embedded system designers may fully utilize the twenty-two available interrupts of the PIC 48 for other applications, as desired.

Direct Memory Access (DMA)

PC/AT Compatibility Requirements

Direct memory access, or DMA, is a technique for transferring data from main memory to a device without involving the processor. Instead data, typically from an I/O device, passes through DMA channels to and from memory, thus freeing up the processor for other operations. DMA thus reduces the amount of processor intervention necessary for performing memory operations.

Figure 6:
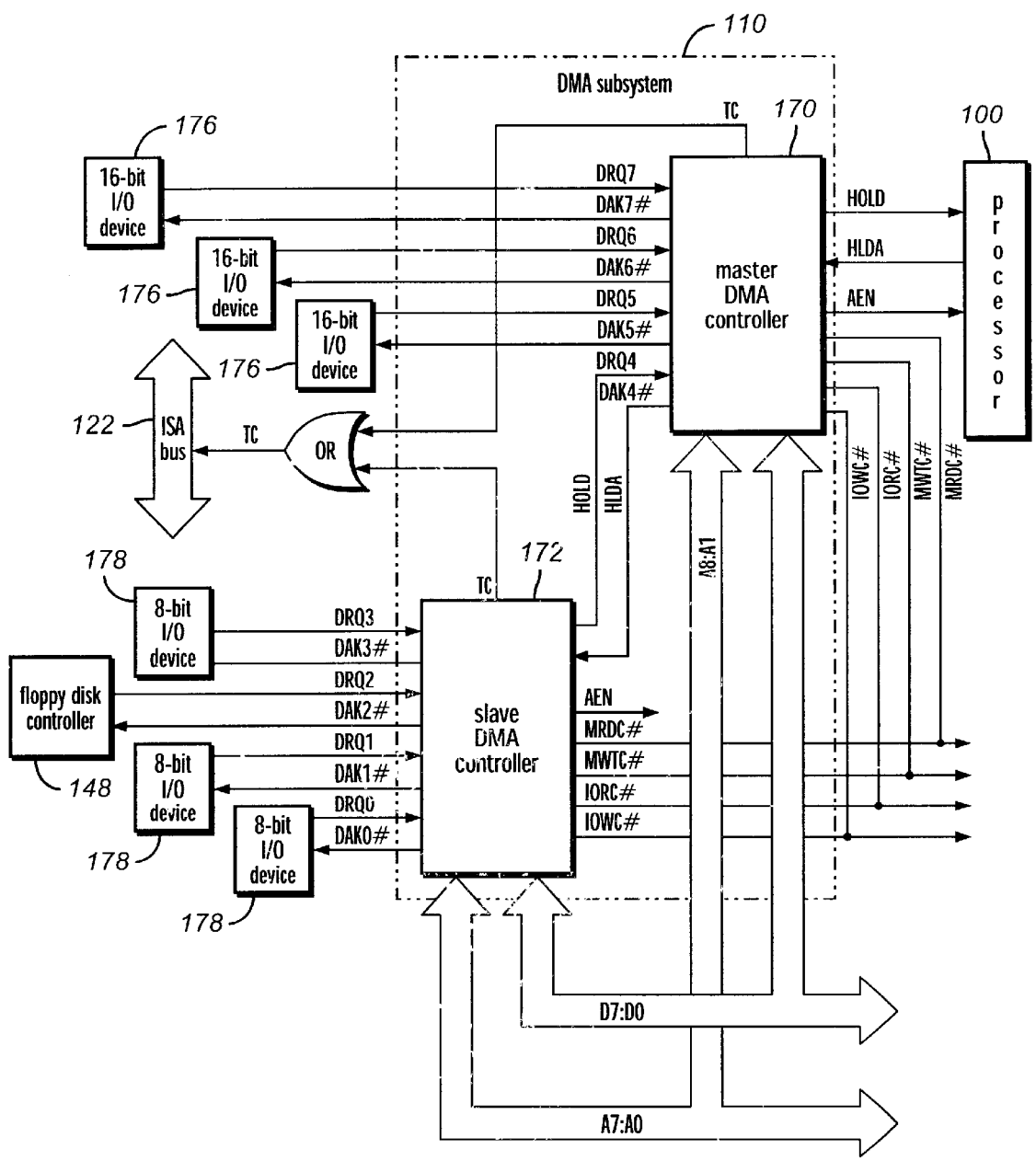
FIG. 6 is a block diagram illustrating the DMA subsystem for a typical PC/AT computer system.

In PC/AT-compatible systems, two cascaded Intel 8237A-compatible DMA controllers are used to provide up to seven DMA channels. FIG. 6 is a block diagram of the DMA subsystem 110, first introduced in FIG. 2. The illustration represents a typical DMA architecture for the PC/AT-compatible computer system S.

The DMA subsystem 110 consists of two 8237 or 8237-compatible DMA controllers 170 and 172. The DMA controller 170 is known as the master DMA controller while the DMA controller 172 is known as a slave DMA controller. Each 8237DMA controller consist of four channels. First, the slave DMA controller 172 has four channels, designated as channels 0 through 3. These channels are dedicated to performing byte operations. Accordingly, FIG. 6 shows three 8-bit I/O devices 178 coupled to each of the DRQ and DAK lines for three of the four channels of the slave DMA controller 172. The fourth DMA channel, channel 2, is connected to a floppy disk controller 148, also an 8-bit device.

The master DMA controller 170 also has four channels, designated 4 through 7. Channel 4 serves as a cascade for the slave DMA controller 172. Thus, three channels, channels 5 through 7 remain available for the master DMA controller 170 for conducting DMA transfer operations. On the master DMA controller 170, channel 4 is programmed to cascade mode and is unmasked so that any of the 8-bit channels of the slave DMA controller 172 can be used. On the master DMA controller 170, channels 5, 6, and 7 are dedicated for word operations. Accordingly, FIG. 6 shows three 16-bit I/O devices 176 coupled to each of the three available channels of the master controller 170.

In PC/AT-compatible systems, the DMA controller 110 performs "fly-by" DMA transfers. Fly-by DMA transfers allow data to be transferred between memory and an I/O device in a single DMA cycle without latching the data internal to the DMA subsystem 110. (Memory-to-memory DMA transfers are not supported for PC/AT-compatible systems.) Thus, fly-by operations enable DMA transfers to occur using a single bus cycle instead of two separate bus cycles (a read into the DMA subsystem 110 followed by a write to or a read from memory).

Each of the seven available DMA channels are used by a different I/O device 176 or 178. Accordingly, FIG. 6 shows seven separate blocks for three 16-bit I/O devices, three 8-bit I/O devices 178, and the floppy disk controller 174 for a total of seven devices which may implement memory transfers using DMA.

To cascade the master DMA controller 170 to the slave DMA controller 172, the hold signal, HOLD, coming from the slave controller 172, is connected to the DMA request signal for channel 4. Likewise, the hold acknowledge signal, HLDA, into the slave DMA controller 172, is connected to the DMA acknowledge signal for channel 4, DAK4#, of the master DMA controller 170.

8237 and 8237-compatible DMA controllers provide two types of software-selectable priority schemes: fixed priority and rotating priority. However, in PC/AT-compatible systems, the two DMA controllers 170 and 172 are programmed for fixed priority during initialization of the computer system S. Fixed priority operates by assigning the highest priority to the lowest channel number, channel 0. Channel 1 has the next highest priority, then channel 2. Channel 3 is assigned the lowest priority. This priority scheme is identical for both the master DMA controller 170 and the slave DMA controller 172.

Although the DMA channels for the master DMA controller 170 are shown in FIG. 6 as channels 4–7, channel 4 is actually channel 0 of the master 170 (i.e., the channel numbers have been renamed to avoid duplication with the slave DMA controller 172 channel assignments). So, since channel 0 of the master DMA controller 170 is connected to the HOLD and HLDA signals of the slave DMA controller 172, channels 0–3 of the slave DMA controller 172 have higher priority than channels 5–7 of the master DMA controller 170. Thus, for PC/AT-compatible systems, channel 0 has the highest priority while channel 7 has the lowest priority.

In a PC/AT-compatible system, the DMA controller has a special way of addressing memory. First, a 16-bit register in the DMA controller contains the lower sixteen bits of an intended address. Then, an 8-bit DMA page register contains the upper address of a 24-bit address. The combination of the two registers provides an address range of up to 16 megabytes. For each of the seven different channels of the two DMA controllers 170 and 172, as shown in FIG. 6, there are seven 8-bit page registers. In a PC/AT-compatible system, these page registers are decoded in I/O address space between 080h and 08Fh. Newer PC/AT systems further provide a set of extended page registers, to lengthen the address range even further.

Looking back to FIG. 6, an address bus from both the master controller 170 and the slave controller 172 is shown. However, address lines A7–A0 connect to the slave DMA controller 172 while address lines A8–A1 connect to the master DMA controller 170. As stated previously, for PC/AT-compatible systems, the slave DMA controller 172 is dedicated to performing 8-bit I/O transfers while the master DMA controller 170 is dedicated to performing 16-bit data transfers. The 8237 DMA controllers were designed to handle byte transfers, however. In PC/AT-compatible systems, therefore, the master DMA controller 170 is connected to the address bus such that 16-bit transfers are possible.

Each DMA controller 170 and 172 provides eight address lines for connection to an address bus. FIG. 6 shows address lines A7:A0 connected to the slave DMA controller 172 while address lines A8:A1 are connected to the master DMA controller 170. Address line, A0, of the system address bus is not connected to the master DMA controller 170. Instead, when the master DMA controller 170 becomes bus master, the A0 line is forced to a 0. When A0 is cleared, a word transfer is indicated. Thus, DMA channels 5 through 7 in a PC/AT-compatible system can only perform 16-bit transfers because the A0 line is always set to 0. The slave DMA controller 172 can, however, still perform byte- or word-oriented DMA transfers.

This particular master DMA controller 170 logic scheme requires the programmer to program the master DMA memory address registers with a different value than the slave DMA controller 172. In essence, the programmer divides the memory address by two (a logical shift left by one bit accomplishes this division) of the address registers when invoking DMA transfers from the master controller 170.

FIG. 6 shows that DMA channel 2 is connected to a floppy disk controller 180. In PC/AT-compatible systems, the DMA channel 2 is made available externally for the floppy drive controller 180 so that DOS can be booted from the system. Also, a transfer complete, or TC, signal is shown coming from both the master DMA controller 170 and the slave DMA controller 172. The TC signal is asserted by either DMA controller 170 or 172 when the word or byte transfer count for a DMA channel has been exhausted. In PC/AT-compatible systems, the TC signal is ORed from each DMA controller 170 and 172 and is subsequently connected to the ISA bus 122, as illustrated in FIG. 6.

Finally, a PC/AT-compatible DMA controller environment requires clock generation of 4 or 8 MHz, depending on the architectural features. Typically, the clock for the DMA controller is synchronous to the ISA bus clock.

Exemplary Implementation

Looking back to FIG. 1, the microcontroller M of the illustrative system includes an integrated DMA controller 22 coupled to the general purpose bus 72. This DMA controller 22 is designed to transfer data between general purpose bus peripherals (either internal or external to the microcontroller M) and the DRAM. This DMA controller 22 may be configured to support PC/AT compatibility.

Figure 7:
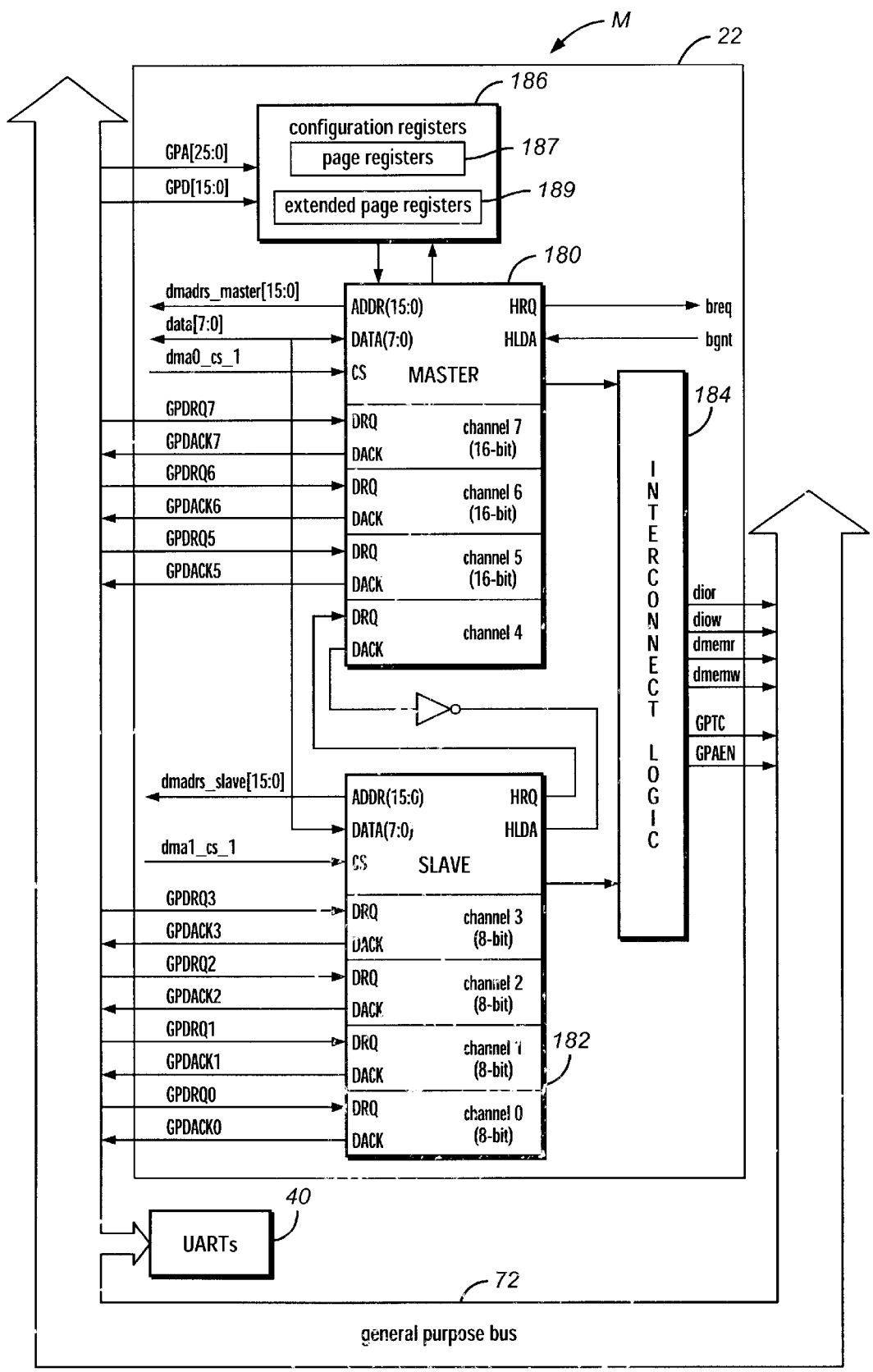
FIG. 7 is a block diagram illustrating the DMA subsystem for an exemplary microcontroller according to one embodiment.

FIG. 7 is a block diagram of the exemplary DMA controller 22 introduced in FIG. 1. Organized according to the PC/AT scheme described above, the DMA controller 22 is made up of two cascaded 8237-compatible DMA controllers 122. The first controller, shown as a master 180, includes channels 4 through 7. The second controller, shown as a slave 182, includes channels 0 through 3.

As FIG. 7 shows, the hold request signal, HRQ, of the slave 182 is coupled to the DMA request signal, DRQ, for channel 4 of the master 180. Likewise, the DMA acknowledge signal, DACK, for channel 4 is coupled to the hold acknowledge signal, HLDA of the slave 182. This coupling of the master 180 and the slave 182 accords with the PC/AT compatibility requirements described above.

The general purpose bus DMA controller 22 supports two modes: a PC/AT-compatible mode or an enhanced mode. The mode selection is made by writing to a memory-mapped register of the microcontroller M, a general purpose DMA control register. In PC/AT-compatible mode, the DMA controller 22 supports three 16-bit channels and four 8-bit channels. In enhanced mode, four channels are individually configurable to be either 8-bit or 16-bit. In addition, enhanced mode supports buffer chaining capability. More details about the buffer chaining capability of the DMA controller 22 are available in commonly assigned patent application, entitled "BUFFER CHAINING," previously incorporated herein by reference. Further, more details about enhanced mode are available in commonly assigned patent application, entitled "DIRECT MEMORY ACCESS CHANNEL CONFIGURABILITY," previously incorporated herein by reference.

In the PC/AT-compatible mode, channels 0 through 3 of the slave DMA controller 182 supports 8-bit data transfers between 8-bit I/O devices and system DRAM. 8-bit DMA may access any location within the system address space. However, the address adder of the DMA controller 22 is only 16 bits wide. Accordingly, 8-bit DMA requests can access memory addressed only up to 64K.

FIG. 7 shows a set of configuration registers 186 which are part of the DMA controller 22. These configuration registers 186 include a set of page registers 187. The address decode unit 38, shown in FIG. 1, asserts a chip select for these configuration registers 186 when the processor 36 accesses the page registers 187. For PC/AT compatibility, the DMA controller 22 also includes nine general page registers (not shown). These registers are 8 bits wide and are located at I/O addresses 80h, 84h–86h, 88h, and 8Ch–8Fh. Refer to Table 4, below, for particular I/O port assignments for a PC/AT-compatible system.

As described above for PC/AT-compatible systems, the memory access limit is resolved for the microcontroller M using the page registers 187, one for each DMA channel, for a total of seven DMA page registers 187. The 8-bit registers 187 extend the accessible address range from 64K to 16M. The microcontroller M further provides seven extended page registers 189, further extending the address space available to the DMA controller 22 of the microcontroller M.

Thus, during an 8-bit DMA transfer, the DMA slave controller 182 provides address bits A15 through A0, one of the DMA page registers 187 provides address bits A23 through A16, and an extended page register 189 provides bits A27 through A24 of the requested address in system memory. A total address range of 128M is thus available to the slave DMA controller 182 for performing 8-bit memory transfers.

To support PC/AT compatibility, the master DMA controller 180 of the microcontroller M shifts the address line, A0, to accommodate 16-bit DMA transfers. Just as in the PC/AT-compatible system shown in FIG. 6, the shift of the A0 line to the master controller 180 of FIG. 7 accommodates its word transfer requirement.

Channels 5 through 7 of the master DMA controller 180 support 16-bit data transfers between 16-bit I/O devices and system DRAM. 16-bit DMA may access any even (word-aligned) location within the system address space. During a 16-bit DMA transfer, the address line, A0, is forced low, the DMA master 180 supplies address bits A16 through A1, the DMA page registers 187 provide address bits A23 through A17, and the extended page registers 189 provides bits A27 through A24 of the requested address in system memory. As with 8-bit transfers, 16-bit DMA requests can access memory up to 128M. This special addressing scheme in the master DMA controller 180 thus accommodates 16-bit data transfers as well as fulfilling compatibility requirements for PC/AT applications.

Looking back to FIG. 7, the seven DMA channels, each consisting of a GPDRQ signal and a GPDACK signal, are shown connected to the general purpose bus 72. For the general purpose DMA controller 22, the initiator of a DMA request is any I/O device that asserts GPDRQ. In the microcontroller M, the initiator is either an external I/O device (or memory-mapped I/O device) residing on the general purpose bus 72. Either an 8-bit (channels 0–3) or a 16-bit (channels 5–7) transfer may be initiated by one of these devices. Alternatively, the initiator may be the internal UARTs 40 of the microcontroller M, although the UARTs in this case may initiate DMA transfers only through the 8-bit channels. For the general purpose DMA controller 22, the target is DRAM. Because of this, the relevant address range is currently mapped to the system DRAM.

Thus, for the microcontroller M, DMA requests may originate from either the internal UARTs 40 or from an I/O device connected to the general purpose bus 72, including those I/O devices which are external to the microcontroller M. An 8-bit I/O device can use any of the channels from the slave 182 while a 16-bit device can use any of the channels from the master 180 (except channel 4). Each I/O device is assigned a GPDRQ/GPDACK signal pair. The microcontroller M provides for programmability of these signals. However, in compliance with PC/AT requirements, the default polarities of GPDRQ and GPDACK are active high and low, respectively.

During a read transfer, the external I/O device asserts its request (GPDRQ) then waits for an acknowledgement (GPDACK). Subsequently, the external I/O device latches the data from the general purpose data bus 72 when the I/O command is asserted (GPIOWR). For a write transfer, the external I/O device asserts its request (GPDRQ), waits for the acknowledge signal (GPDACK), and places the data on the general purpose data bus 72 when the I/O command (GPIORD) is asserted.

Because the microcontroller M provides that external devices on the general purpose bus 72 may be mapped into memory address space, memory-mapped I/O devices can execute DMA transactions just as regular I/O devices can. The only exception is that the commands being issued are GPMEMRD and GPMEMWR instead of GPIORD and GPIOWR.

The general purpose DMA controller 22 also supports variable clock modes at either 16, 8, or 4 MHz. The internal state machines of the general purpose DMA controller 22 are clocked by the input 33 MMhz clock. Only the I/O command signals are scaled down to the selected 4 or 8 Mhz operating frequency to support PC/AT compatibility.

Programmable Interval Timer (PIT)

PC/AT Compatibility Requirements

In PC/AT-compatible systems, an 8254 or 8254-compatible programmable interval timer, or PIT, is used to generate pulses at software-controllable intervals. The PIT provides three frequencies, or distinct timers, for the system. In typical PC/AT applications, a timer0 is used as a system timer, a timer1 is used to control memory refresh, and a timer2 may control a speaker output.

The three timers, timer0, timer1, and timer2, are driven by a 1.19318 MHz clock signal in PC/AT systems. During power on, an 0FFFFh is programmed as a divisor for the timer0. This value causes the output frequency of timer0 to be approximately 18.2 times per second. Put another way, the output of timer0 is pulsed every 54.9 ms. Timer0 is available for use as a general purpose timer by programmers.

Figure 8:
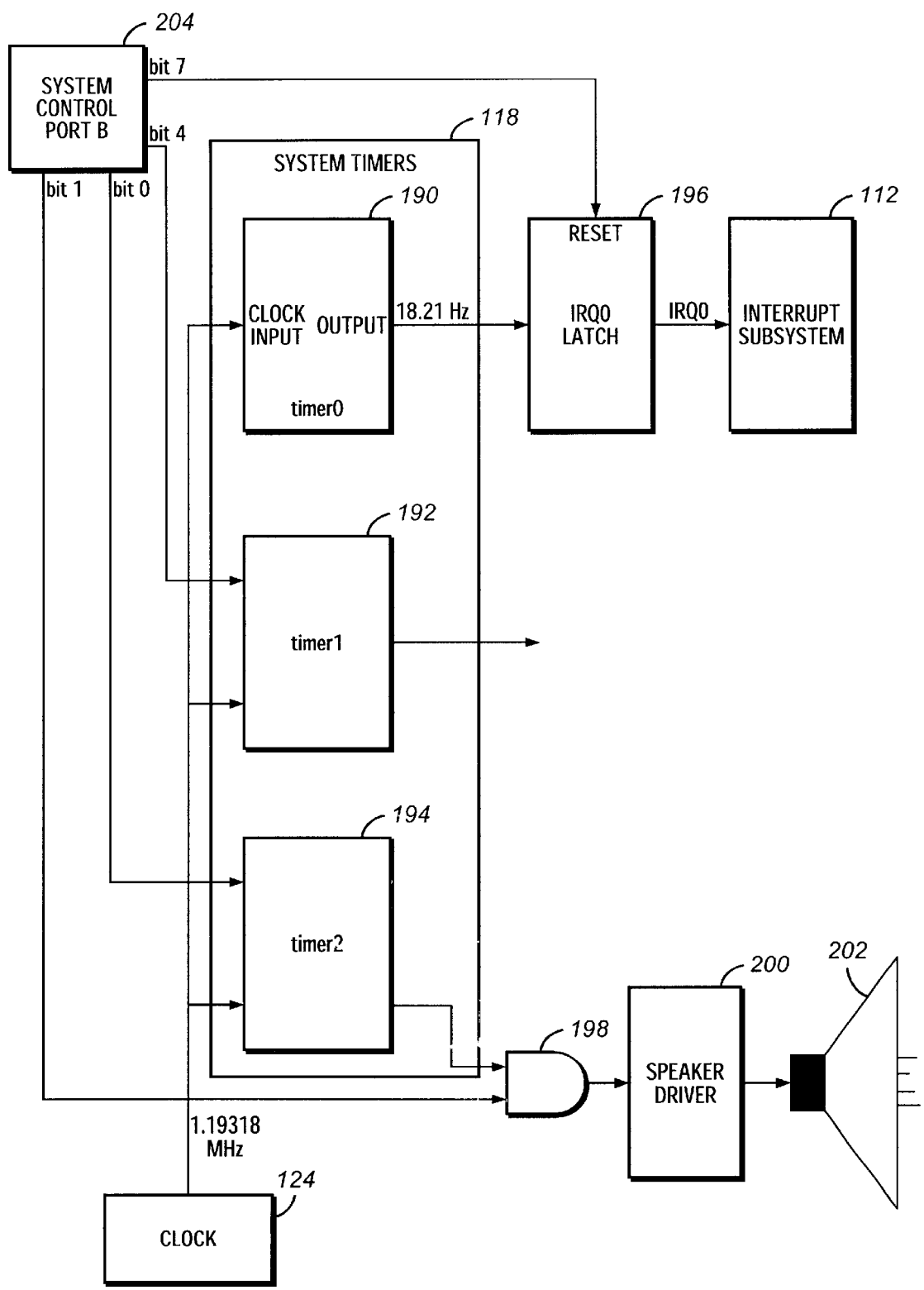
FIG. 8 is a block diagram illustrating the programmable timers for a typical PC/AT computer system.

FIG. 8 is a block diagram illustrating the programmable interval timer logic for a typical PC/AT system. First, the system timers block 118, (FIG. 2), is shown. The system timer 118 is an 8254 or 8254-compatible programmable interval timer (PIT) consisting of three timers. Accordingly, FIG. 8 shows a timer0 190, a timer1 192, and a timer2 194. Each of these timers receives as input a clock signal from the clock 124. In PC/AT-compatible systems, the clock signal runs at 1.19318 MHz.

As explained above, the divisor for timer0 is typically programmed with an 0FFFFh at power up. This divisor causes a 18.21 Hz clock pulse output from the timer0 190. This signal is then fed into an IRQ0 latch 196 followed by the interrupt subsystem 112, triggering an interrupt to the master PIC 130 (see FIG. 3). At a frequency of 18.21 Hz, IRQ0 is generated every 54.9 ms. This causes the IRQ interrupt service routine to be executed once every 54.9 ms.

The timer1 192 of the system timer 118 was originally used as a refresh timer. Today, in PC/AT-compatible systems, timer1 192 is used as a programmable frequency source. The same 1.19318 MHz signal that is fed into the timer0 190 also provides the input clock signal to the timer1 192 and the timer2 194. The timer2 194 may be used to drive a speaker 202, as shown in FIG. 8. Refer to Table 4, below, for particular I/O port assignments for a PC/AT-compatible system.

PC/AT-compatible systems provide two I/O ports to allow programmers to control some of the hardware of the computer system S. Known as system control ports A and B, the ports are located at I/O addresses 92h and 61h, respectively.

FIG. 8 shows a system control port B 204. An 8-bit register, the system control port B 204 is used to control the reset of the IRQ0 latch 196 (bit 7), provides a latch to the timer1 192 (bit 4) and the timer 2 194 (bit 0), and provides a gate to a speaker output (bit 1).

Exemplary Implementation

For a variety of embedded system needs, the microcontroller M of the illustrative system actually includes four timing modules. These modules include the general purpose timers 52, the programmable interval timers 62, the watchdog timer 32, and the software timer 64. All four timer subsystems are coupled to the general purpose bus 72, as shown in FIG. 1.

The programmable interval timers (PITs) 62 are available, particularly to supply embedded system designers with PC/AT capability. The PIT 62 includes three 16-bit timers. One interrupt output is provided for each timer as well as one external output pin for the second timer. Further, the PIT 62 provides a clock source from either a 1.1882 MHz source or, alternatively, a clock source from an external pin. The same clock source is routed to all three timers.

Figure 9:
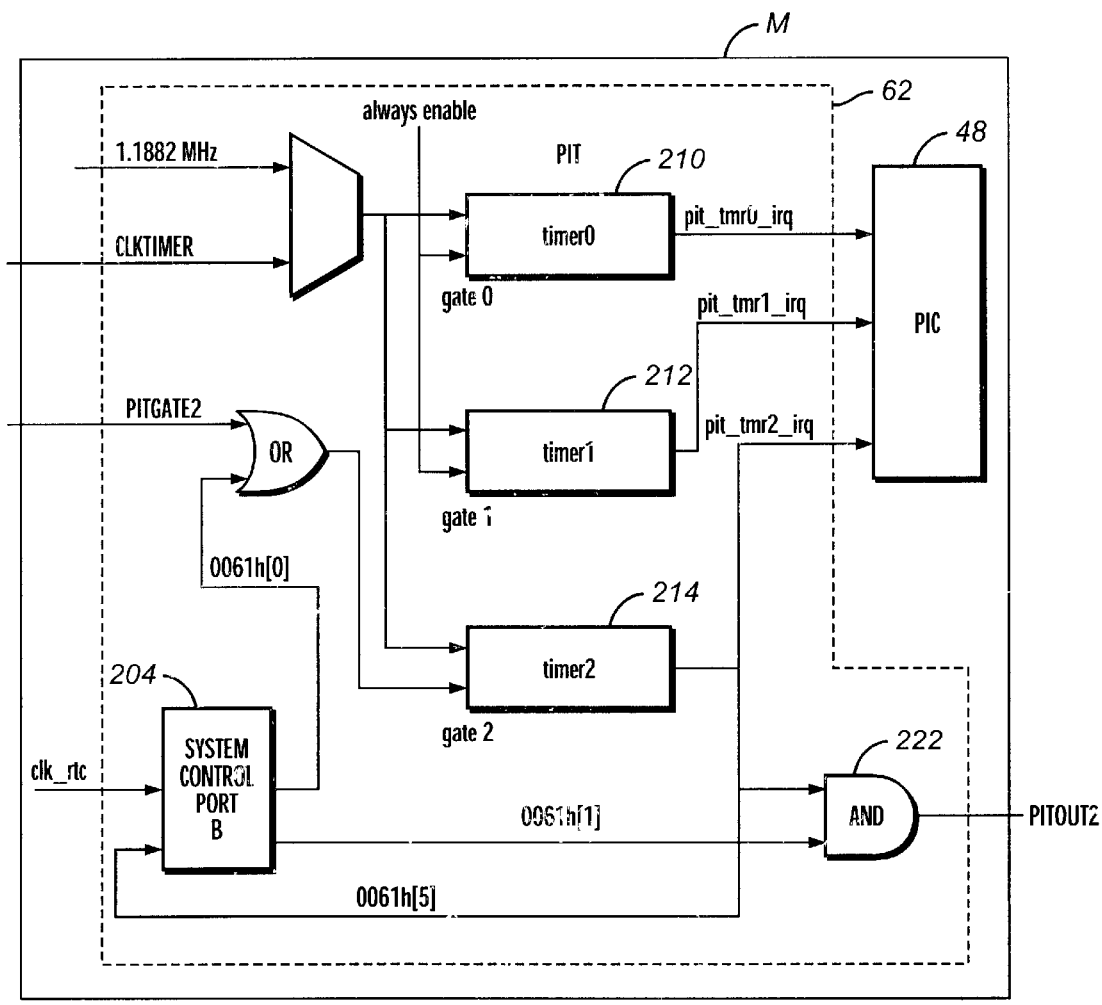
FIG. 9 is a block diagram illustrating the programmable timers for an exemplary microcontroller according to one embodiment.

FIG. 9 is a block diagram illustrating the PIT 62 of the microcontroller M. The PIT 62 includes a timer0 210, a timer1 212, a timer2 214, and the port B 204 (FIG. 8). In the configuration of the microcontroller M, all three timer outputs are input into the PIC 48. The timer0 210 of the PIT 62 is used for generating interrupt requests. In the microcontroller M, the output of the timer0 210 is hardwired internally to drive an interrupt request of the programmable interrupt controller 48. The timer0 210 can be configured to assert IRQ0 to operate in PC/AT-compatible mode.

The timer1 212 of the PIT 62 is used as a general purpose timer. Like the timer0 210, the output of the timer1 212 is hardwired internal to the microcontroller M to drive an IRQ of the programmable interrupt controller 48, if desired.

The timer2 214 of the PIT 62 is also used as a general purpose timer. The output of the timer2 214 is hardwired internal to the microcontroller M to drive an IRQ of the programmable interrupt controller 48. The output of the timer2 214 can be read by reading the bit 5 of the system control port B 204, as shown in FIG. 9. The gate line for the timer2 214 is controlled by bit 0 of the system control port B 204. Alternatively, the gate for the timer2 214 may be controlled by an external pin, shown in FIG. 9 as PITGATE2 (PITGATE2 is a multiplexed pin, so if disabled, the gate line for the timer2 214 is controlled only by bit 0 of the system control port B 204). As with the PC/AT-compatible system shown in FIG. 8, the output of the timer2 214 is fed into an AND gate 222, the other input of which is controlled by bit 1 of the system control port B 220. If desired, the timer2 214 output may be used to drive a speaker. Accordingly, the microcontroller M provides a pin, denoted as PITOUT2 in FIG. 9, for connection to an external device such as a speaker.

The PIT 62 is configured using direct-mapped registers of the microcontroller M. The three timers of the PIT 62 may be programmed for a variety of operating modes. These include interrupt on terminal count, hardware retriggerable one-shot, rate and square wave generation, and hardware and software retriggerable strobe.

As stated above, typical PC/AT system boot code programs the PIT 62 timer0 count register 210 (at I/O address 40h), with a value of 0FFFFh. However, this programming value relies on the assumption that the input clock source to the PIT 62 is a 1.19318 MHz source. (This means the timer0 counts down from 65,535 to zero at a rate of 1.193 million counts per second, resulting in a pulse every 54.93 ms.)

However, the microcontroller M of the illustrative system does not provide a 1.19318 MHz clock source. Instead, the PIT 62 clock source is a 1.1882 MHz clock source as FIG. 9 shows.

For system designers incorporating the microcontroller M into a PC/AT-compatible system, there are two possible ways to address this difference in clock source. First, the timer0 count register 210 of the PIT 62 may be modified by the system boot code. Instead of programming the PIT timer0 count register 210 with an 0FFFFh, a value of 0FEF3h provides the desired PC/AT-compatible output rate of 54.93 ms.

Alternatively, a system designer may choose to supply an external clock source frequency of 1.19318 MHz to the PIT 62. The microcontroller M includes a dedicated pin for the purpose of connecting such an external clock. The pin is then specifically configured for this functionality by the system boot code during the system boot process prior to configuring the PIT 62. Either implementation results in the desired PC/AT-compatible count pulse rate.

Thus, the microcontroller M of the illustrative system provides a flexible architecture which supports both PC/AT-compatible general purpose timers as well as system timers for other non-PC/AT-compatible operating modes.

Real-Time Clock (RTC)/CMOS/NMI

PC/AT Compatibility Requirements

PC/AT-compatible systems use a Motorola MC146818 or compatible real-time clock (RTC), for keeping track of the date, the time, and the configuration of the computer system S. The RTC uses power obtained from a battery which is input to the device. The battery maintains the time and system configuration during power loss.

The RTC chip also contains low-power memory known as CMOS (short for complementary metal oxide semiconductor). CMOS memory is used as configuration memory, to store information about the configuration of the computer system S. The MC146818 has a total of 64 bytes of CMOS memory. The first 14 CMOS locations are used to keep track of date and time and to control the real-time clock. The remaining 50 memory locations are used to store system configuration information and the century portion of the date.

Figure 10:
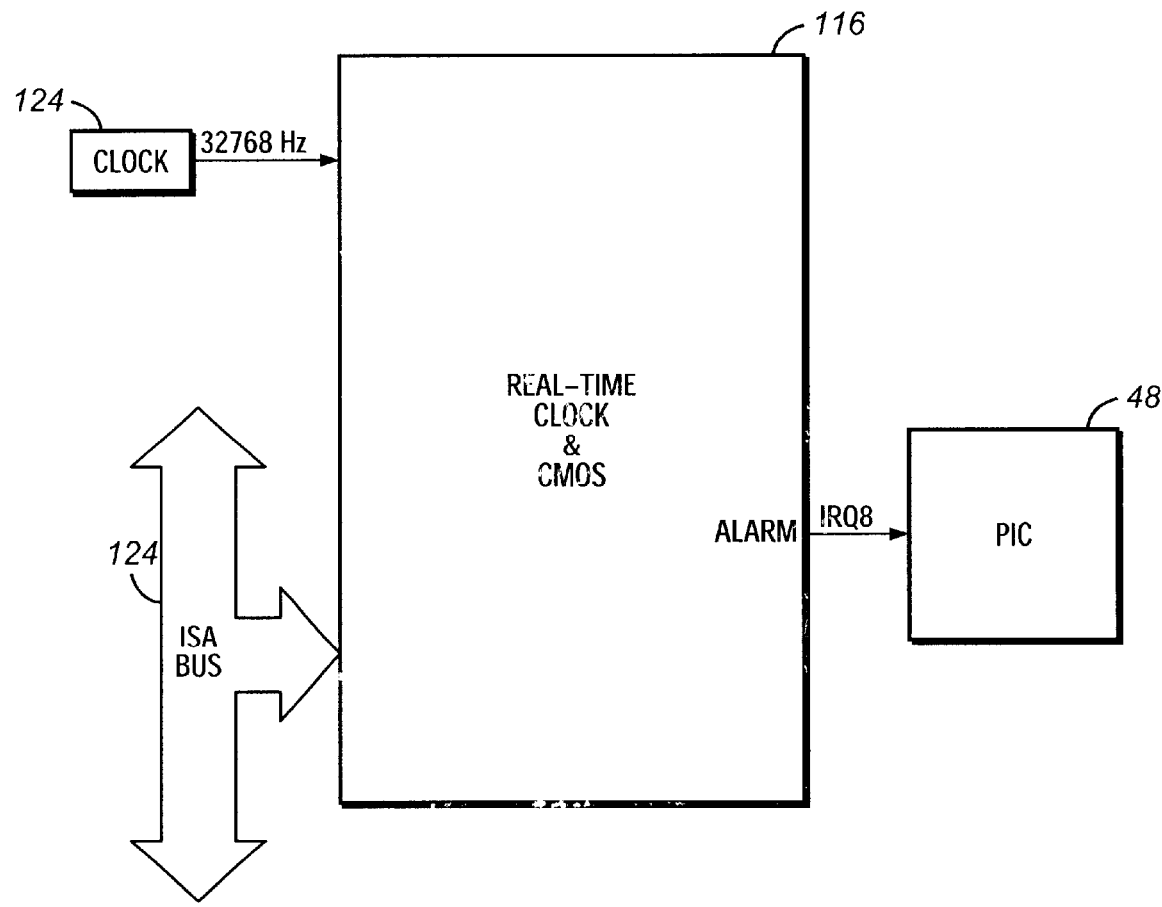
FIG. 10 is a block diagram illustrating the RTC & CMOS features for a typical PC/AT computer system.

FIG. 10 is a block diagram of the real-time clock and CMOS RAM 116 (FIG. 2). As shown, the RTC 116 receives as input a 32768 Hz clock. The output of the RTC 116 is fed into the PIC 48 as the input for an interrupt request, IRQ8.

The RTC 116 is an I/O-mapped device. I/O port 70h is shared between an NMI mask register and the configuration memory address register of the RTC 116. Bit 7 of the index register (70h) is used to enable non-maskable interrupts (NMI). Refer to Table 4, below, for particular I/O port assignments for a PC/AT-compatible system.

In addition to the maskable INTR input to the processor 100 of FIG. 3, Intel 8086 and compatible microprocessors include an interrupt request input known as an NMI input. For a non-maskable interrupt request input, the NMI input is not masked with respect to the processor. Instead, the microprocessor immediately services an NMI request. Thus, the NMI input is typically used to report serious hardware failures to the microprocessor.

Figure 11:
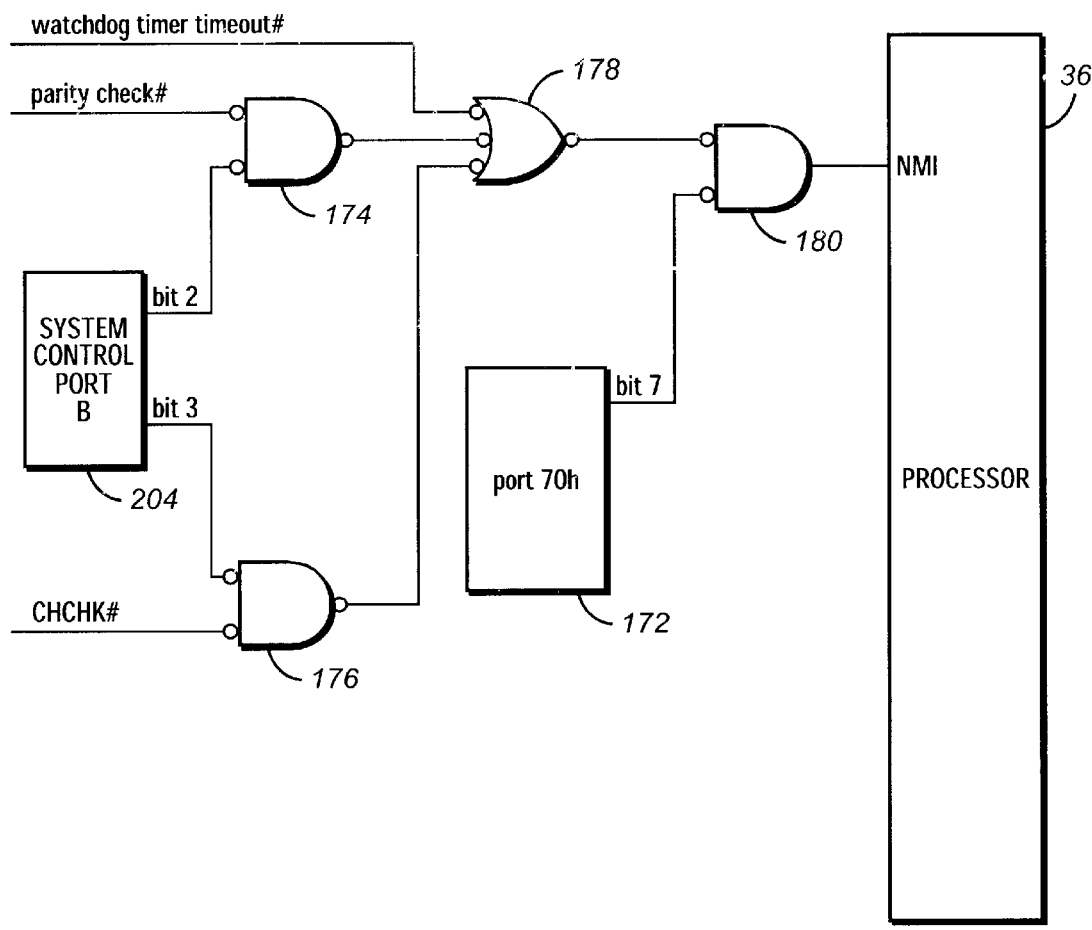
FIG. 11 is a block diagram illustrating an NMI configuration for a typical PC/AT computer system according to one embodiment.

NMI capability is a standard feature of PC/AT-compatible systems. However, different PC/AT-compatible systems use NMIs for different purposes. For example, some but not all legacy systems used NMI for memory parity errors. FIG. 11 is a block diagram illustrating a typical configuration for reporting non-maskable interrupts in a typical PC/AT-compatible system. Additionally, FIG. 11 illustrates the possible sources of such NMIs.

First, a CHCHK#, a channel or I/O check signal, is asserted by a device connected to the ISA bus 122 to signal an error condition to the processor 36. However, in order for the CHCHK# signal to actually get to the NMI input of the processor 36, both the NMI input to the processor 36 and the CHCHK# signal should be enabled. Accordingly, FIG. 11 shows an NAND gate 180, which acts as the NMI enable/disable gate. Next, a NAND gate 176 acts as the channel check enable/disable gate. The NMI signal is enabled by clearing bit 7 of port 70h 172. Likewise, the channel check enable/disable gate 176 is enabled by clearing bit 3 of the system control port B 204.

Alternatively, in a PC/AT-compatible system, an NMI may be issued to the processor 36 as a result of a parity error. Accordingly, FIG. 11 shows a parity check # signal as input to a NAND gate 174. This gate 174 acts as the DRAM parity error enable/disable gate. This gate 174 is enabled by clearing bit 2 of the system control port B 204. Finally, an NMI results in some PC/AT-compatible systems due to the timeout of a watchdog timer. Briefly, a watchdog timer is used to protect against programs which behave badly. That is, programs which disable interrupts for exceedingly long periods of time, etc. Accordingly, FIG. 11 shows a signal as one of three inputs to a NOR gate 178 for the timeout of a watchdog timer. The NOR gate 178 also receives the parity check # and CHCHK# signals, as described above. The output of the NOR gate 178 feeds into the NMI enable/disable gate 180.

Although FIG. 11 shows a typical PC/AT NMI configuration, legacy systems employ some variety in how NMI is implemented.

Exemplary Implementation

The microcontroller M of the illustrative system provides a real-time clock which is Motorola MC146818-compatible. The RTC consists of a time-of-day clock with an alarm and a 100 year calendar. The clock/calendar has a programmable periodic interrupt and 114 bytes of static user RAM. The RTC has its own power pin and reset separate from the rest of the core supplies. When the RTC is powered off, the RTC remains powered up and in full functional mode, maintaining time, calendar and user RAM data.

Looking back to FIG. 1, the CMOS RAM is part of the RTC 60. Typically the CMOS RAM 60 contains system configuration information. Accordingly, this information must not be lost when the system is powered down. The battery connected to the real-time clock 60 keeps the CMOS information from being lost during power down.

For the microcontroller M, the NMI enable feature is provided by the interrupt control register 167 of the PIC 48, rather than bit 7 of I/O port 070h, as in PC/AT-compatible systems (refer back to FIG. 5). However, firmware supporting embedded systems using the microcontroller M may readily be modified to support non-maskable interrupts. Writes to bit 7 of the index register (I/O port 70h) for the RTC 60 have no effect and do not affect the index of the data accessed at the RTC data port (I/O port 71h).

For example:

| | MOV | AL, 85h |
|---|---|---|
| | OUT | 70h, AL | and

| | MOV | AL, 05h |
|---|---|---|
| | OUT | 70h, AL | both result in the contents of the RTC alarm hour register (RTC index 05h) being accessed at the RTC data port (71h).

Looking back to FIG. 4, the PIC 48 of the microcontroller M is shown. This PIC 48 may be programmed in software such that most of the hardware interrupt sources can generate an NMI to the processor 36. In the disclosed embodiment, only an ECC interrupt from the DRAM controller 20 is not routed to the NMI input of the processor 36.

The microcontroller M thus provides a flexible architecture for a variety of embedded systems. For PC/AT-compatible systems, some firmware and software modification may be necessary. However, due to the difference in nature of the use of NMIs in legacy systems (memory, parity errors, and channel check) and in the microcontroller M (mappings to any interrupt source), compatibility issues are minimal.

ISA Bus

PC/AT Compatibility Requirements

When the PC/AT computer was announced in 1984, its creator, IBM, never specified an AT bus standard. Therefore, each manufacturer of personal computers chose its own standard. For example, the clock which drove the original AT bus ran at 8 MHz. Some manufacturers, however, provided AT buses which ran at 8.33 MHz or 10 MHz or even 12.5 MHz.

Eventually, manufacturers agreed to an AT bus standard. The standard was named the ISA Industry Standard Architecture bus standard. This standard is generally considered to be compatible with the AT bus in the original IBM PC/AT. Therefore, for purposes of discussing PC/AT compatibility, this application treats the ISA bus and similar buses as the PC/AT buses.

The ISA standard specifies that the ISA bus runs at 8.33 MHz. The bus frequency is generated by dividing a processor clock. However, the ISA bus typically runs asynchronously to the processor. For example, if a DMA controller that runs at 5 MHz initiates a bus cycle, the operation will run asynchronous to the processor.

The ISA bus has twenty-four address lines, just like the processor of the first PC/AT (which included an 80286 processor). Thus, a PC/AT-compatible system may have 16 Mb of memory at most. Because a PC/AT-compatible system supports up to 1K of I/O address space, the ISA bus must also have a signal line which indicates whether a memory or an I/O access is made.

The data bus portion of the ISA bus is sixteen bits wide. Thus, a PC/AT-compatible system supports both 8- and 16-bit data widths. The data bus includes a lower portion, consisting of data lines D7–D0, and an upper portion, consisting of data lines D15–D8.

Figure 12:
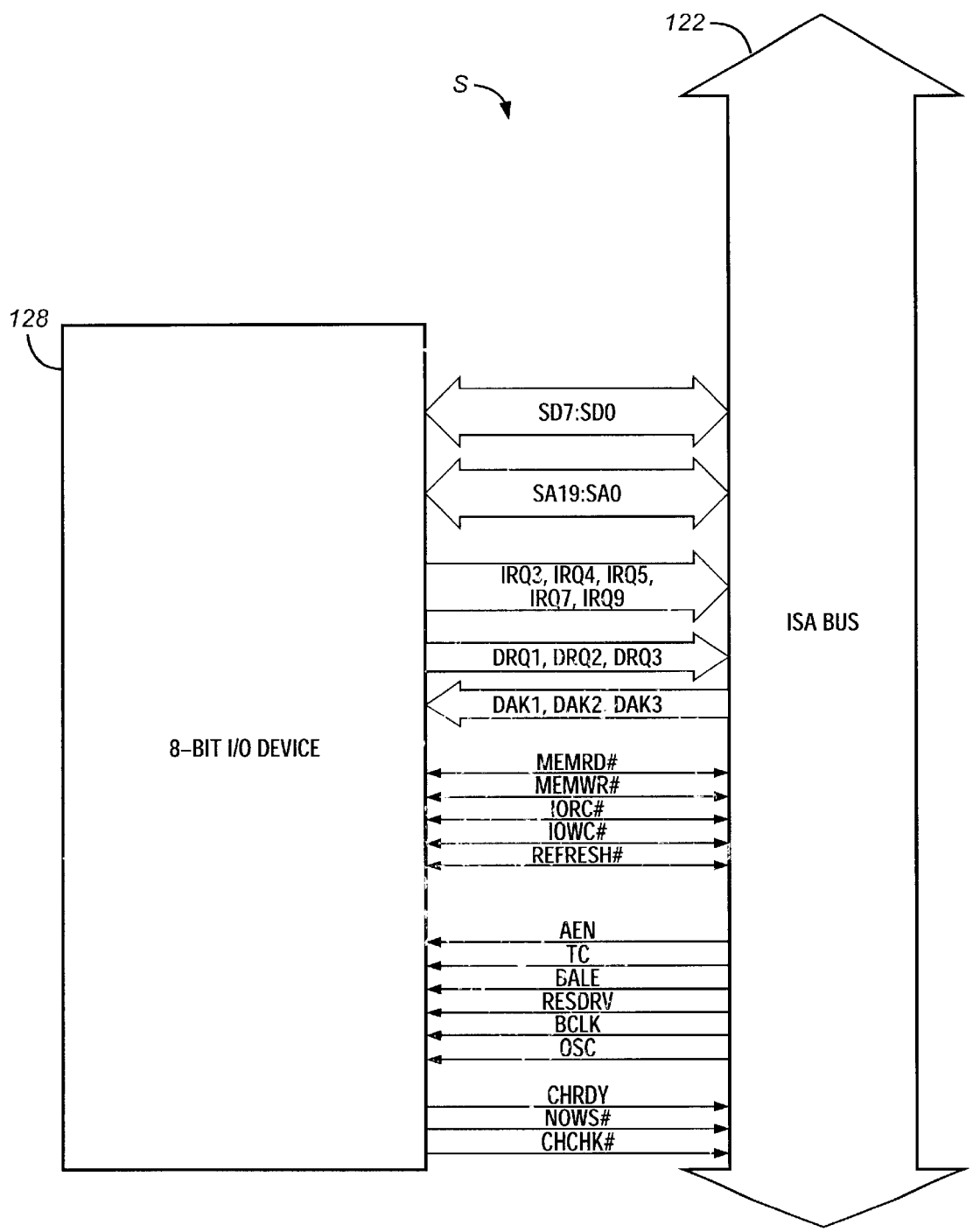
FIG. 12 is a block diagram illustrating an 8-bit ISA bus for a typical PC/AT computer system.

FIG. 12 is a block diagram showing the ISA bus 122 (FIG. 2). The ISA bus 122 is shown coupled to an 8-bit I/O device 128 by a plurality of signals. The signals make up the interface of the ISA bus 122 and enable connection between the 8-bit I/O device 128 and other components of the computer system S.

The address range for the 8-bit ISA bus is 1M. Thus, FIG. 12 shows twenty address lines, SA19:SA0, also called the address bus. When the processor 100 initiates a bus cycle, the processor 100 places the address on the address bus; all devices connected to the ISA bus 122 can "see" the address.

Next, the I/O device 128 interfaces to an 8-bit data bus, shown as SD7:SD0. As an 8-bit device, only eight data lines are connected to the ISA bus 122, as shown in FIG. 12.

Because a PC/AT-compatible system also supports up to 1K of I/O address space, the ISA bus 122 also has a signal line to indicate whether a memory or an I/O access is being made. The bidirectional signals MEMRD#, for memory read command, MEMWR#, for memory write command, IORC#, for I/O read command, and IOWC#, for I/O write command, are shown in FIG. 12 to indicate the type of bus cycle being initiated.

In a PC/AT-compatible system, the ISA bus also supports dynamic cycle timing control. Using the CHRDY signal, slower I/O devices may insert wait states in order to lengthen bus cycles. In FIG. 12, the CHRDY signal is shown originating from the I/O device 128 and going onto the ISA bus 122, to interrupt the processor 100 (not shown).

Another feature of the ISA bus 122 in PC/AT-compatible systems is that DMA channels and interrupt request lines are available to I/O devices connected to the ISA bus 122. These signals allow I/O devices 128 connected to the ISA bus 122 to implement DMA with memory and to interrupt the processor, as needed.

Up to six interrupt request lines are available for the 8-bit I/O device 128 to interrupt the processor 100. Accordingly, IRQ3, IRQ4, IRQ5, IRQ6, IRQ7, and IRQ9 are shown directed to the ISA bus 122 in FIG. 12. One can refer back to the section of this application on the PIC 112 for more details about the interrupts.

To support DMA, three DMA request lines are shown originating from the 8-bit I/O devices 128 to the ISA bus 122. They are DRQ1, DRQ2, and DRQ3. These DMA requests originate only from the slave DMA controller 172. Likewise, three DMA acknowledge signals are shown, DAK1, DAK2, and DAK3, originating from the ISA bus 122 to the 8-bit I/O device 128.

The ISA bus 122 shows additional signals which perform a variety of functions. These signals are familiar to developers of bus architecture and thus are not explained fully here. The bidirectional signal REFRESH# is asserted whenever memory is being refreshed. A number of signals going to the 8-bit I/O device 128 include AEN, TC, BALE, RESDRV, BCLK, and OSC. Signals directed to the ISA bus 122 include CHRDY, NOWS#, and CHCHK#.

Figure 13:
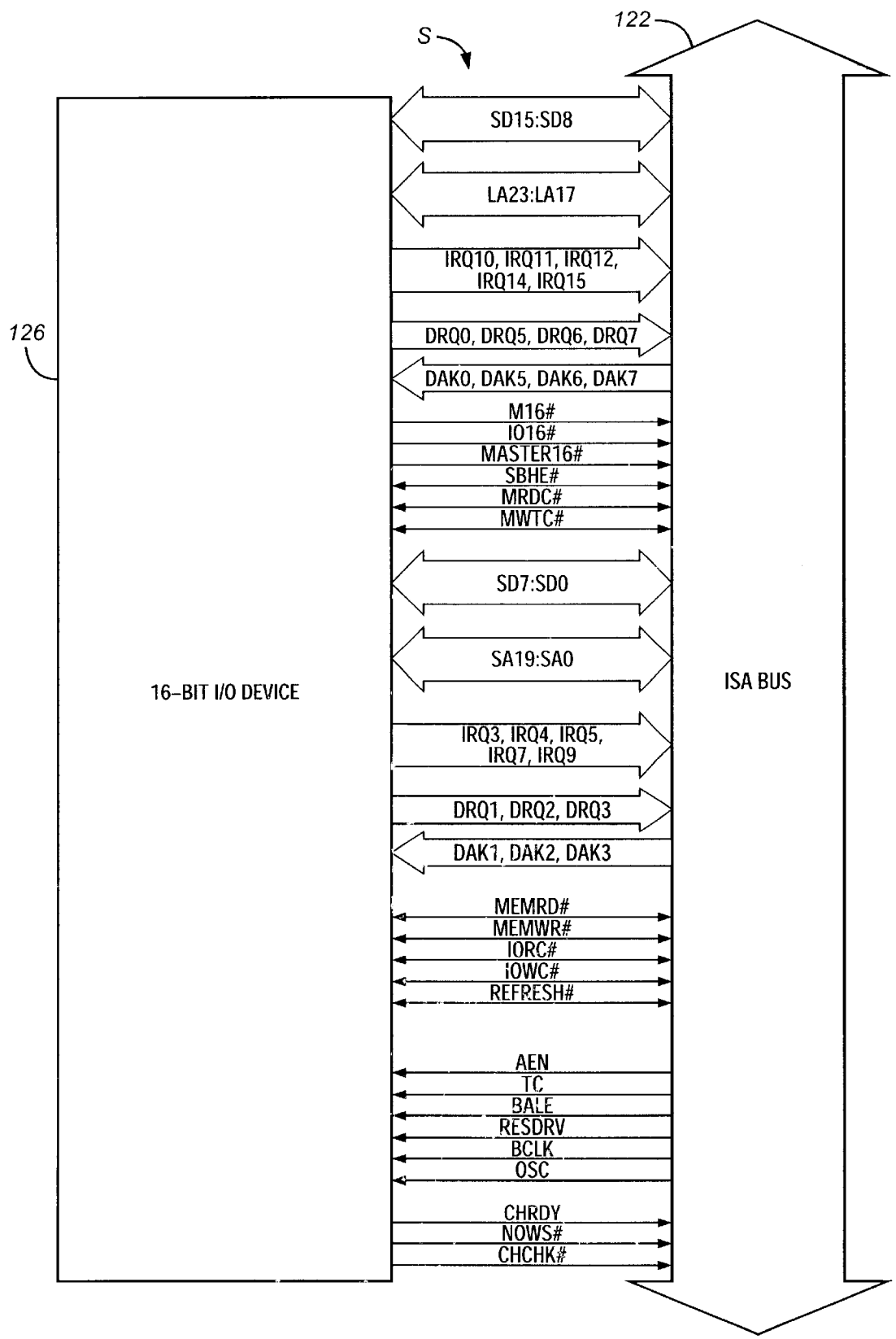
FIG. 13 is a block diagram illustrating a 16-bit ISA bus for a typical PC/AT computer system.

Although only an 8-bit data path, SD7:SD0, is shown in FIG. 12, a PC/AT-compatible system supports both 8- and 16-bit data widths and, thus, provides connection to 16-bit I/O devices. FIG. 13 is a block diagram illustrating the signals which connect either an 8-bit I/O device 128 or a 16-bit I/O device 126 to the ISA bus 122. All signals shown in FIG. 12, above, which connect to an 8-bit device 128 likewise connect to the 16-bit device 126. Further, the 16-bit ISA bus 122 supports additional signals.

First, to accommodate 16-bit data widths, FIG. 13 shows data lines D15–D8, in addition to data lines D7–D0 of FIG. 12, coupled to the ISA bus 126. FIG. 13 also includes a bidirectional SBHE# signal. The SBHE# signal is set during 8-bit transfers when an odd address is accessed (uses D15–D8). Further, the SBHE# signal is set during 16-bit transfers when an even address is being accessed.

Another feature of the ISA bus 122 is its support for dynamic bus sizing. As disclosed above, the data portion of the ISA bus 122 is 16 bits wide. Two signals, M16# and IO16# are provided to support dynamic bus sizing on the ISA bus 122.

For memory transfers, the M16# signal is asserted to inform the bus master that a 16-bit device is participating in the operation. The 16-bit device is connected to both data paths, D15–D8 and D7–D0. The bus master may thus transmit data over both data paths. Likewise, the IO16# signal is asserted to inform the bus master that a 16-bit I/O device is participating in an I/O operation. The deassertion of either of these signals, M16# or IO16#, informs the bus master that an 8-bit device is participating in the transaction.

Besides the three DRQ/DAK signals available for 8-bit devices 128 (see FIG. 12), four additional 16-bit DMA channels are made available for connection to the 16-bit I/O device 126 of FIG. 13. Thus, signals DRQ0, DRQ5, DRQ6, and DRQ7 are shown originating from the 16-bit I/O device 126 while signals DAK0, DAK5, DAK6, and DAK7 are sent to the 16-bit I/O device 126 from devices connected to the ISA bus 122.

Besides the six IRQ signals available for 8-bit I/O devices 128 (see FIG. 12), five additional IRQ signals are available to connect to the 16-bit I/O device 126 of FIG. 13. Thus, signals IRQ10, IRQ11, IRQ12, IRQ14, and IRQ15 are shown in FIG. 13 originating from the 16-bit I/O device 126 and sent to the interrupt subsystem 112 (not shown) for interrupting the processor 100 (not shown).

The ISA bus 122 further supports ISA bus master capability. Typically, the processor 100 acts as the master of the ISA bus 122. However, for a device which is connected to either DMA channel 5, channel 6, or channel 7, the device may act as a bus master on the ISA bus 122. Thus, in PC/AT-compatible systems, only 16-bit I/O devices 126 may be bus masters on the ISA bus 122.

Since a 16-bit I/O device 126 connected to the ISA bus 122 may act as bus master, this means that the ISA bus 122 supports peer-to-peer transfers. Peer-to-peer transfers are those between I/O devices themselves. However, the ISA bus 122 does not support transfers between a 16-bit bus master and an 8-bit slave.

In the PC/AT-compatible computer system S, the ISA bus 122 supports fly-by DMA transfers. As explained above, fly-by DMA permits transfers to take place in a single bus cycle between an I/O device and memory. During a fly-by DMA transfer, a memory read cycle can occur simultaneously with an I/O write cycle on the ISA bus 122. Alternatively, a memory write cycle and an I/O read signal can occur simultaneously on the ISA bus 122.

To support such simultaneous read and write cycles, the ISA bus 122 includes both a read strobe and write strobe for the I/O device 126 which is separate from the read strobe and write strobe for the memory. Both the I/O device 126 and the memory use the same address and data buses, however.

Further, for the ISA bus 122 to support fly-by DMA transfers the bus 122 accommodates different data widths as between the memory and the I/O device 126. Alternatively, the ISA bus 122 imposes a rule to guarantee that transfers between devices of differing data widths do not occur. The ISA bus 122 is implemented using both rules. First, the SBHE#, or System Byte High Enable, signal is asserted when a 16-bit memory device communicates with an 8-bit I/O device 128. (Additional data steering logic is also provided for this case.) Further, the ISA bus 122 prohibits transfers between 16-bit I/O devices and 8-bit memory.

For PC/AT-compatible systems, the ISA bus 122 specifically prohibits memory-to-memory transfers. This is so even though the 8237 DMA controller can implement such transfers. The ISA bus architecture simply does not accommodate memory-to-memory transfers. For one thing, memory cards come in a great variety, including 8-bit and 16-bit, and each card may have distinct timing associated with it. By contrast, with fly-by DMA, the transaction between an I/O device and memory is paced only by the memory itself (only the memory card adds wait states, while the peripheral device does not). Memory-to-memory transfers require buffering data and accommodating different memory speeds. Because the string move operations (e.g., MOVSW and STOSW) provided by 8086 and compatible processors are quite efficient, the absence of memory-to-memory transfer capability on the ISA bus is inconsequential.

To support the ISA bus 122, the PC/AT-compatible system S typically includes an ISA bus controller. The controller provides control signaling for the ISA bus and may also be used to control integrated peripheral devices. The ISA bus controller also typically includes configuration registers to control various operating parameters, such as clock speed options. The clock for the ISA bus controller is typically in the 8 to 33 MHz range and is synchronous with the integrated processor bus interface unit.

The ISA bus controller starts an ISA bus cycle based on initiation from the processor 100 or the DMA controller/cache front-end snooping logic. During the ISA bus cycle, the ISA bus controller monitors CHRDY and returns a ready indicator to the processor bus interface controller. Further, the ISA bus controller returns bus size status. The ISA bus controller also generates signaling to accommodate both 8-bit and 16-bit devices. Further, the ISA bus controller generates signaling to accommodate memory regions below 1M. The ISA bus controller controls data steering functions for mismatched transfer sizes, read data latches, and other operations. Finally, the ISA bus controller provides an address path and control to support bus mastering on the ISA bus 122 via the DMA channels.

Exemplary Implementation

Looking back to FIG. 1, the microcontroller M includes a general purpose bus 72 and general purpose bus controller 24. The general purpose bus controller 24 is integrated into the microcontroller M and the general purpose bus 72 provides dedicated pins for connections to external peripheral devices.

The general purpose bus 72 is both an internal and an external bus to the microcontroller M. The general purpose bus 72 connects 8-bit or 16-bit peripheral devices to the microcontroller M without glue logic. The general purpose bus 72 may be configured to operate as an ISA bus, for embedded system designs which desire PC/AT compatibility. However, the general purpose bus 72 may also be configured for non-PC/AT-compatible mode, as needed, to support other embedded designs.

Figure 14:
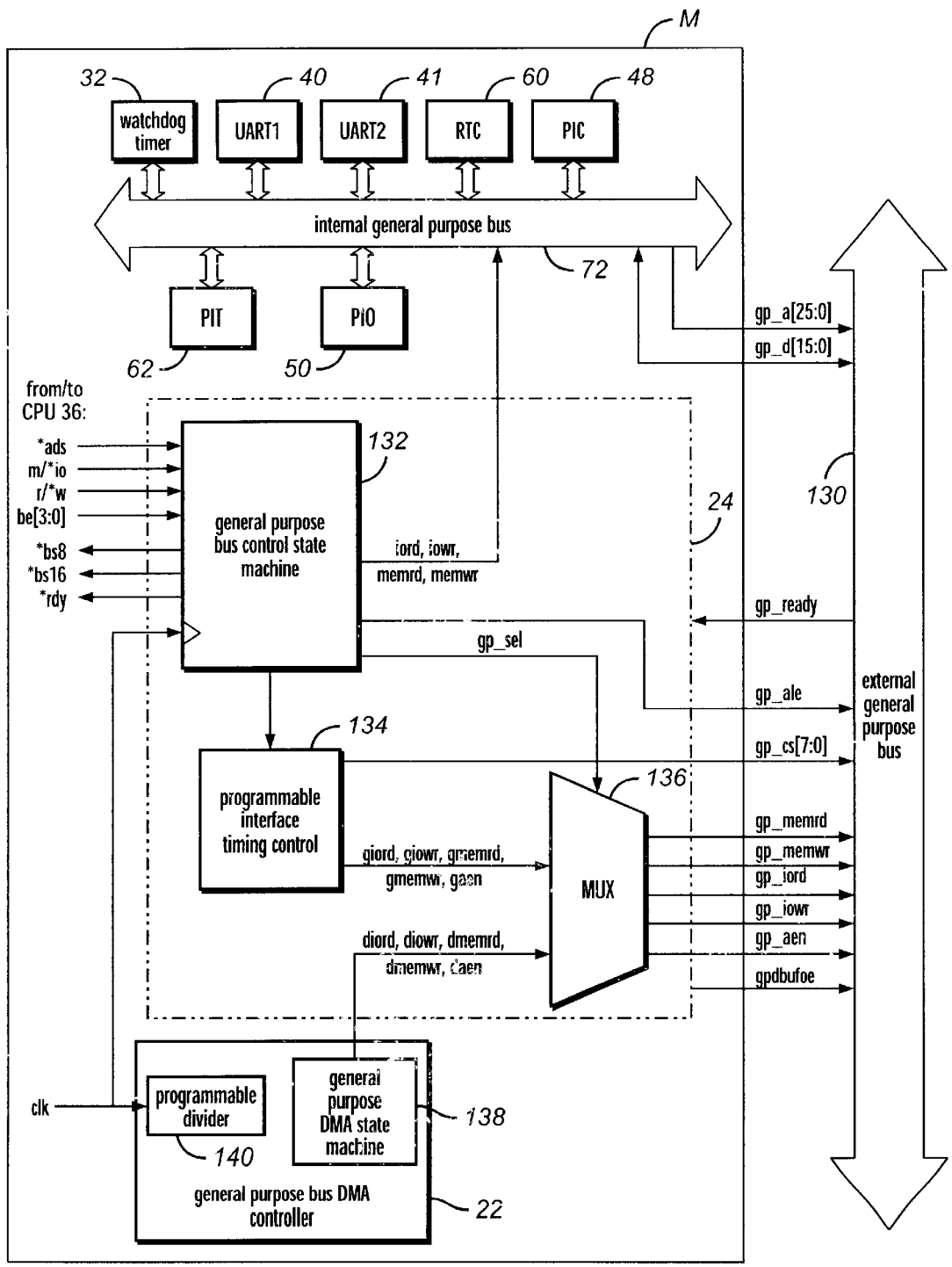
FIG. 14 is a block diagram illustrating a capability of a general purpose bus of an exemplary microcontroller to act as an ISA bus in accordance with one embodiment.

FIG. 14 is a block diagram illustrating the logic associated with the general purpose bus 72 and the general purpose bus controller 24. The general purpose bus controller 24 provides programmable timing capability. Shown in FIG. 14, a programmable interface timing control mechanism 134 enables peripheral components with different timing and protocol requirements to simultaneously occupy the general purpose bus 72. Thus, both ISA bus peripherals which run at 4.77 MHz and those which run at 8 MHz can be connected to the general purpose bus 72. Further, for embedded system designs, the general purpose bus 72 may be programmed to emulate an ISA bus. The programmable timing capability of the general purpose bus controller 24 is discussed in more detail in the commonly assigned patent application, entitled "GENERAL PURPOSE BUS WITH PROGRAMMABLE TIMING," previously incorporated herein by reference.

FIG. 14 shows that the general purpose bus 72 may be extended external to the microcontroller M, shown as an external general purpose bus 130. Twenty-six address lines are coupled to the external general purpose bus 130, for a total of 64M of addressable memory. Sixteen data lines are coupled to the external general purpose bus 130, for supporting 8- or 16-bit I/O devices. Also, up to eight external chip select signals are coupled to the external general purpose bus 130, allowing for up to eight external peripheral devices.

The general purpose bus controller 24 supports both 8- and 16-bit I/O and memory cycles. The signals gp_memrd, gp_memwr, gp_iord, gp_iowr, and gp_aen signals are all shown coupled to the external general purpose bus 130. The general purpose bus controller 24 provides a programmable bus interface timing feature. The bus interface timing can be programmed for all the chip select signals, the gp__iord, gp__iowr, gp__memrd, gp__memwr, and gp__ale.

Like the ISA bus 122, the general purpose bus 72 supports dynamic bus sizing. FIG. 14 shows both the *bs8 and *bs16 signals for this purpose. Further, the general purpose bus 72 supports dynamic cycle timing control, wherein slower I/O devices may insert wait states when communicating with the processor 36. The signal analogous to CHRDY on the ISA bus 122 is shown in FIG. 14 as gp__ready. This signal comes from any I/O device connected to the external general purpose bus 130 in order to provide wait states to the processor 36. In support of dynamic bus sizing, the general purpose bus 72 also includes a GPBHE signal, analogous to the SBHE# signal of the ISA bus 122 (see FIGS. 11 and 12).

The general purpose bus 72 and the general purpose bus controller 132 does not support bus master capability, as described above. However, the general purpose bus controller 132 supports both 8-bit and 16-bit DMA initiators just as does a PC/AT-compatible system.

Like the ISA bus 122, the general purpose bus 72 supports fly-by DMA transfers. FIG. 14 shows the general purpose DMA controller 22, including a general purpose DMA state machine 138 and programmable divider 140. From the general purpose DMA controller 22, memory read, memory write, I/O read, I/O write, and address enable signals are provided to the external general purpose bus 130. (One can refer back to the section of this application entitled "Direct Memory Access (DMA)" for details on the DMA support provided by the microcontroller M.)

Table 3 is a list of signals for the ISA bus 122 and associated signals used by the general purpose bus 72. As Table 3 shows, some ISA bus features are not available in the microcontroller M. However, for embedded system designers intending to use the microcontroller M in a PC/AT-compatible environment, these differences are readily overcome. First, the general purpose bus 72 does not support external master access. Instead, the processor 36 is always the master on the general purpose bus 72. However, external masters may readily be accommodated by the PCI bus 82, as shown in FIG. 1.

TABLE 3

Cross-reference table of ISA bus signals and the general purpose bus signals

| ISA buss 122 signal name (# indicates active low signal) | general purpose bus 72 signal name (* indicates active low signal) |
|---|---|
| BALE | GPALE |
| SA19–SA0 | GPA19–GPA0 |
| LA23–LA17 | GPA23–GPA17 |
| (Not Supported) | GPA25–GPA24 |
| SBHE# | *GPBHE |
| AEN | GPAEN |
| SD15–SD0 | GPD15–GPD0 |
| MRDC# | *GPMEMRD |
| MWTC# | *GPMEMWR |
| IORC# | *GPIORD |
| IOWC# | *GPIOWR |
| M16# | *GPMEMCS16 |
| IO16# | *GPIOCS16 |
| CHRDY | GPRDY |
| REFRESH# | (Not Supported) |
| MASTER16# | (Not Supported) |
| CHCHK# | Supported through GPIRQ |
| RESDRV | GPRESET |
| BCLK | (Not Supported) |
| OSC | (Not Supported) |

TABLE 3-continued

Cross-reference table of ISA bus signals and the general purpose bus signals

| ISA buss 122 signal name (# indicates active low signal) | general purpose bus 72 signal name (* indicates active low signal) |
|---|---|
| IRQ | GPIRQ |
| DRQ | GPDRQ |
| DACK# | *GPDACK |
| TC | GPTC |

Looking back to FIGS. 11 and 12, a bi-directional REFRESH# signal is shown coupled between either an 8-bit I/O device 128 or a 16-bit I/O device 126. On the microcontroller M, the REFRESH# pin is not supported. The DRAM refresh is not echoed out to the general purpose bus 72 according to the architecture of the microcontroller M. Therefore, the REFRESH# pin is not needed.

FIGS. 11 and 12 also show a signal, NOWS#, originating from either the 8-bit I/O device 128 or the 16-bit I/O device 126. Because of the programmable interface timing capability of the general purpose bus controller 24, the NOWS# signal is not supported for the microcontroller M. Finally, the BCLK and OSC pins, originating from the ISA bus 122 in FIGS. 12 and 12, are not supported. Because a typical ISA interface is asynchronous, these signal were deemed unnecessary. External oscillators may be used if needed for the microcontroller M.

I/O Addressing Requirements

PC/AT Compatibility Requirements

For the PC/AT-compatible computer system S of FIG. 2, physical devices in the system may be addressed by assigning address ranges to each device. Devices such as memory are accessed by writing to or reading from an address in memory space. Other devices may be accessed by reading and writing a port defined in an I/O address space.

A PC/AT-compatible system includes a set of ports which have become an industry standard. These ports provide standard I/O addresses for such devices as DMA controllers, keyboards, interrupt controllers, interval timers, and serial I/O.

In a PC/AT-compatible system, 1 K of memory is dedicated to an I/O map. The I/O map represents a portion of memory which is accessible using the IN and OUT instructions of the 8086 or compatible processor. (This is in contrast to regular memory, which is accessed using the MOV instruction.) A 1K I/O map is addressed from 0000h–03FFh.

Table 4 shows the PC/AT-compatible I/O map.

TABLE 4

Typical I/O port assignment for a PC/AT-compatible system

| I/O Address | description |
|---|---|
| 000h–00Fh | slave DMA controller |
| 020h–021h | master PIC |
| 040h–043h | primary PIT |
| 048h–04Bh | secondary PIT |
| 060h | keyboard/mouse interface data port |
| 061h | system control port B/NMI status register |
| 064h | keyboard/mouse interface command/status port, hot reset |
| 070h | RTC/CMOS address port/NMI enable |
| 071h | RTC/CMOS data port |
| 080h–08Fh | DMA page registers |
| 0092h | system control port A |
| 0A0h–0A1h | slave PIC |

TABLE 4-continued

Typical I/O port assignment for a PC/AT-compatible system

| I/O Address | description |
|---|---|
| 0C0h–0DFh | master DMA controller |
| 0F0h | FPU error interrupt request clear |
| 0F1h | numeric coprocessor reset |
| 0F8h–0FFh | numeric coprocessor ports |
| 170h–17Fh | secondary fixed disk controller |
| 1F0h–1FFh | primary fixed disk controller |
| 200h–20Fh | game port |
| 270h–27Fh | secondary parallel printer port |
| 2F0h–2FFh | secondary serial port |
| 370h–377h | secondary diskette controller |
| 378h–37Fh | primary parallel printer port |
| 3F0h–3F7h | primary diskette controller |
| 3F8h–3FFh | primary serial port |

An issue with PC/AT I/O mapping is that the original architecture decoded only ten bits of the available 16-bit 8086 and compatible I/O space. (Had the full 16 bits been decoded, the address range would have been 64K). However, many drivers and applications depend on address aliasing which occurs with addressing above 03FFh. For example, a PC/AT-compatible I/O device may write to address 07FFh. However, the device expects that the address 03FFh will be addressed, due to address aliasing.

A PC/AT-compatible system requires fixed address decoding of all direct-mapped PC/AT peripheral devices. The output of the address decode must provide chip selects for each peripheral device. Further, an indexing mechanism for access to chipset-specific configuration registers is required.

To support a PCI bus in a PC/AT-compatible system, a decode of the 0CF8h–0CFFh range is required for the PCI bus host bridge. This range is an alias of the original 80287 numeric co-processor ports at 0F8h–0FFh. However, for systems implementing PCI, an 80287 numeric co-processor should not be necessary because most 8086-compatible processors today embed the coprocessor function.

Exemplary Implementation

The microcontroller M of the illustrative system provides I/O space to support PC/AT compatibility. A set of programmable address region, or PAR, registers are provided to configure both physical memory and I/O regions for the microcontroller M. The PAR registers are used to define four characteristics: the target device, attributes for the region, the size of the address region, and the start address for the region. The PAR registers thus provide a flexible mechanism for both memory and I/O space mapping.

Figure 15:
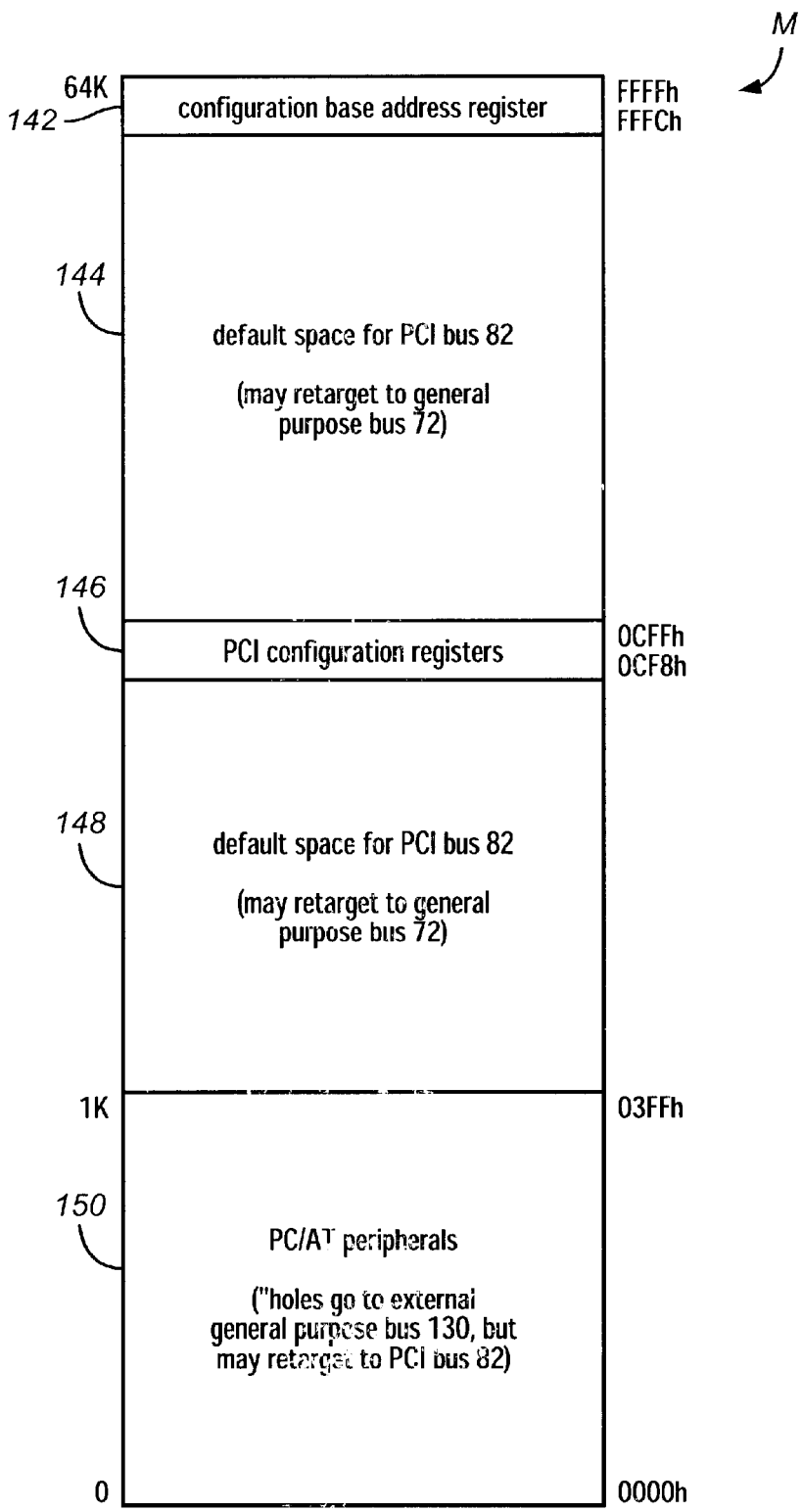
FIG. 15 is a representation of an I/O address map for an exemplary microcontroller according to one embodiment.

FIG. 15 is an illustration of the system I/O map for the microcontroller M. The I/O space is partitioned into five regions: a configuration base address register region 142, a default PCI bus space region 144, a PCI configuration register region 146, a default PCI bus space region 148, and a region for PC/AT peripherals 150.

The configuration based address register is a 32-bit register which is used to relocate the integrated memory-mapped peripherals and other registers, allowing for a more flexible system memory map. The CBAR is fixed in I/O space at 0FFFCh–0FFFFh. FIG. 15 shows two I/O address ranges which address the PCI bus 82 regions 144 and 148. The microcontroller M provides the capability for both of these regions 144 and 148 to be re-targeted to the general purpose bus 72, if desired. The system I/O map further includes a region 146 for addressing PCI configuration registers. The PCI configuration registers are addressed at I/O ports 0CF8h–0CFFh.

Finally, a region 150 is shown in FIG. 15. This is a 1K region addressed from 0000h–03FFh in I/O space. This region 150 is dedicated for PC/AT peripherals. Looking back to FIG. 1, recall that the microcontroller M supports several integrated peripheral cores which are PC/AT-compatible. These includes the DMA controller 22, the programmable interrupt controller 48, the programmable interval timer 62, the UARTs 40, the real-time clock 60, and various control and status registers. The I/O addresses for these devices are automatically decoded by the address decode logic 38 of the microcontroller M, and require no special initialization. Table 5 summarizes the I/O map for these integrated peripheral devices.

TABLE 5 peripheral I/O map for the microcontroller M

| I/O address | peripheral core |
|---|---|
| 0000h–000Fh | Slave General Purpose Bus DMA Controller |
| 0020h–0021h | Master Programmable Interrupt Controller (PIC) |
| 0024h–0025h | Slave Programmable Interrupt Controller (PIC) |
| 0040h–0043h | Programmable Interval Timer (PIT) |
| 0060h, 0064h | Keyboard Control A20M and Fast Reset (SCP) |
| 0061h | System Control Port B/NMI Status |
| 0070h, 0071h | Real-Time Clock (RTC) Index/Data |
| 0080h, 0084h–0086h, 0088h, 008Ch–008Eh | General Purpose Scratch Registers |
| 008Fh | General Purpose Scratch Register |
| 0081h–0083h, 0087h 0089h–008Bh | General Purpose Bus DMA Page Registers |
| 0092h | System Control Port A |
| 00A0h–00A1h | Slave Programmable Interrupt Controller (PIC) |
| 00C0h–00DEh (even addresses only) | Master General Purpose Bus DMA Controller |
| 00F0h | Clear Floating Point Error Interrupt Request |
| 02F8h–02FFh | Serial Port COM2 (UART #2) |
| 03F8h–03FFh | Serial Port COM1 (UART #1) |

As with a PC/AT-compatible system, the master PIC 160 is addressed using I/O addresses 20h–21h. Likewise, the slave PIC 162 is addressed using I/O addresses 0A0h–0A1h. However, Table 5 shows an additional address range 024h–025h for the slave PIC 164. This slave PIC 164 is not defined in standard PC/AT architecture. However, the microcontroller M includes the additional slave PIC to provide additional interrupt request sources. (Refer back to the section entitled "Programmable Interrupt Controller (PIC)" for details on the PIC support provided by the microcontroller M.)

The I/O ports 060h and 064h are listed in Table 5 as being dedicated to keyboard control, A20M, and Fast Reset (SCP). In one embodiment, accesses to these locations are directed to the external general purpose bus 130. However, these locations are also snooped internally for PC/AT functions. The I/O port 061h is dedicated to system control port B and NMI status. Reads and writes to this location are directed to this system control port B and are not seen on the external general purpose bus 130.

Also in Table 5, several I/O addresses, dedicated to general purpose scratch registers, are shown. The general purpose scratch registers are unused I/O port locations from the original PC/AT computer. These I/O ports are maintained in the microcontroller M for PC/AT compatibility. Writes to the scratch registers are also seen on the external general purpose bus 130. However, reads from the scratch registers do not initiate a cycle on the external general purpose bus 130. In contrast, I/O address 08Fh, also dedicated for a general purpose scratch register, is another unused I/O port from the original PC/AT computer. However, reads and writes to this general purpose scratch register (I/O port 08Fh) are not seen on the external general purpose bus 130.

Regarding the general purpose bus DMA page registers (I/O ports 81h–83h, 87h, and 89h–8Bh), reads and writes to these locations are directed to these registers only. Like the scratch register at I/O port 8Fh, accesses to the DMA page registers are not seen on the external general purpose bus 130.

The microcontroller M also may be programmed to allow the internal UARTs 40 and the real-time clock 60 to be disabled. This permits embedded system designers to use an external device when preferred. When the UARTs 40 and the RTC 60 are disabled, the I/O cycle is forwarded to the external general purpose bus 130. Embedded system designers looking for a PC/AT-compatible solution thus may utilize features embedded into the microcontroller M or may replace the features with alternative ones, if desired.

In addition to fixed address decoding of PC/AT peripherals, the microcontroller M provides chip select signals. When adding I/O devices to the external general purpose bus 130, the microcontroller M provides a set of programmable address region, or PAR, registers for this purpose. By programming a PAR register for each device connected to the external general purpose bus 130, a chip select signal is automatically configured for that device.

For devices which do not perform their own address decode, the microcontroller M supports a number of programmable I/O (PIO) signals. These PIO signals may be programmed to provide a chip select signal to the peripheral device connected to the external general purpose bus 130.

For devices which perform their own address decode, the chip select signal is not needed, thus, no PIO programming is necessary. The PAR register programming supplies the I/O ports needed to address the device. A more detailed description of the PAR registers is provided in the commonly assigned patent application, entitled "METHOD AND APPARATUS FOR OVERLAPPING PROGRAMMABLE ADDRESS REGIONS," previously incorporated herein by reference.

Despite the programmable logic, in the disclosed embodiment, the regions in memory required for the internal peripheral devices of the microcontroller M cannot be relocated via the PAR registers. Instead, the regions required for these peripheral devices are fixed in I/O space. The regions for the general purpose bus DMA controller 22, the PIT 62, the PIC 48, the two UARTs 40, the RTC 60, and the PC/AT port logic 74 cannot be relocated via the PAR registers.

PC/AT System Memory Map

PC/AT Compatibility Requirements

In a PC/AT-compatible system, memory is typically addressed in a linear fashion. The bottom of memory is addressed as 00000000h and ends at the top of the memory. The top of memory is defined by the total size populated (the maximum size supported by the DRAM controller of the system). Typically, a PC/AT-compatible system has 64M of memory.

Figure 16:
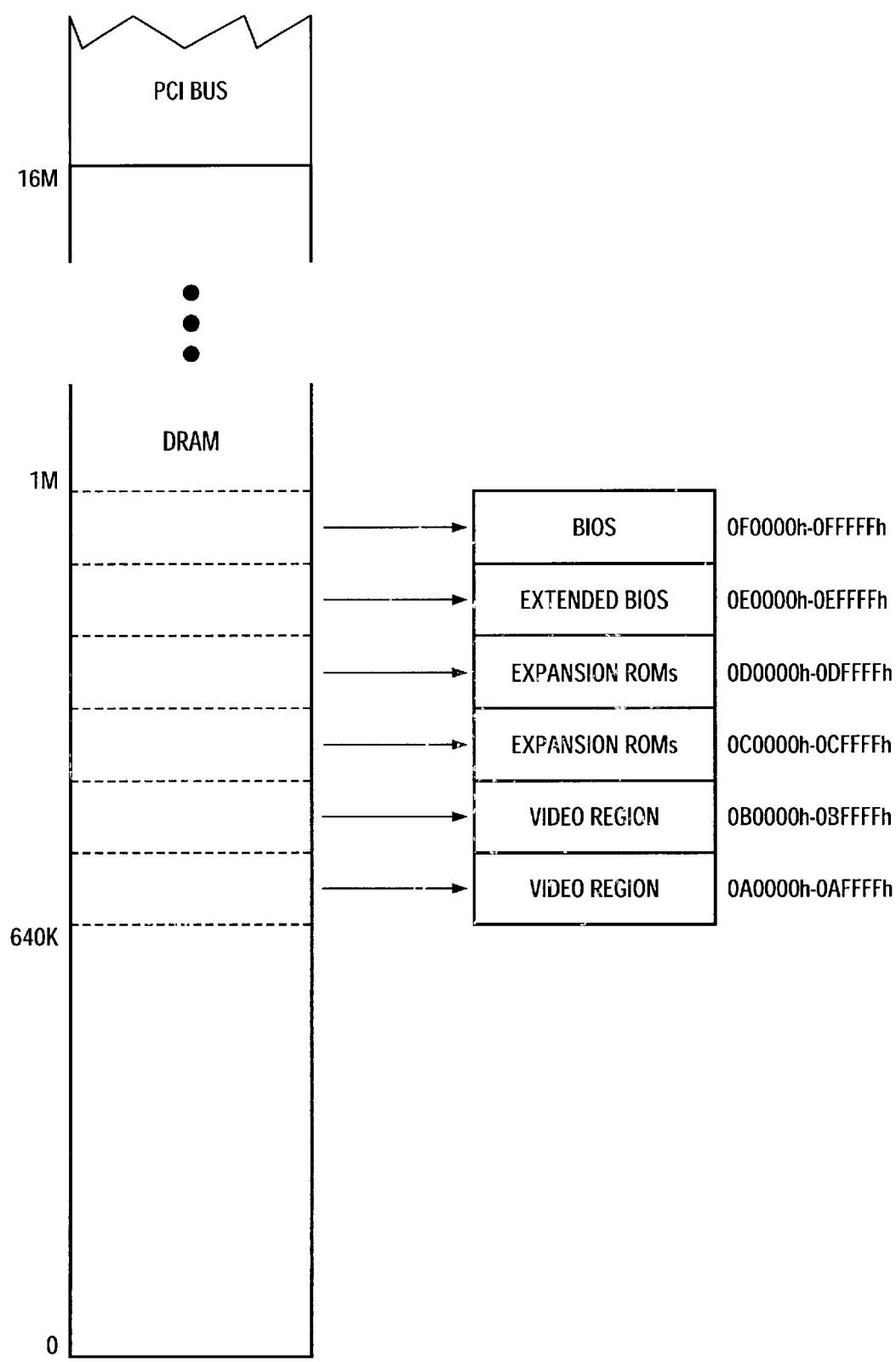
FIG. 16 is a representation of a memory map for a typical PC/AT computer system.

FIG. 16 is an illustration of the memory map for a PC/AT-compatible system. In this example, the total memory amount is 16M. All accesses in memory space above the top of memory are redirected to the PCI bus, if present.

In PC/AT-compatible systems, several memory regions are decoded to support devices besides the memory (DRAM) itself. For example, the boot ROM, which includes the power-up code and the BIOS, is addressed between 0F0000h and 0FFFFFh, as shown in FIG. 16. Also, in a PC/AT-compatible system, a PCI bus video card is typically mapped to 0A0000h–0BFFFFh. The DRAM which would otherwise be addressed in these ranges are sometimes referred to as "DOS holes" because of the interruption of the otherwise linear mapping of the DRAM.

FIG. 16 shows that 384 K of the memory map, addresses from 0A0000h to 0FFFFFh, are redirected to non-DRAM devices. These included video regions (128K), expansion ROM regions (128K), and BIOS regions (128K).

Note that the overlaid 384K region is below 1M in the illustrated memory map. These particular regions are "overlaid" in the region below 1M rather than being addressed above the DRAM address map because the original 8086 processor only ran in real mode. When the processor runs in real mode, only regions addressed up to 1M may be accessed (with one exception, not pertinent here). When the system S powers on, the processor 100 is running in real mode. The processor 100 must be able to access the ROM in order to execute POST. Thus, at least for the first few instructions, the ROM must be addressable somewhere below 1M.

Because of this mapping of the ROM into the DRAM address space, a windowing mechanism is typically provided in PC/AT-compatible systems to redirect such accesses out to the ROM located on the ISA bus 122. In modem systems, the redirect may be to the PCI bus because an ISA bus bridge typically connects the ISA bus to the PCI bus.

In some PC/AT-compatible systems, the BIOS will "shadow" these redirected regions for faster execution. Essentially, shadowing is copying the ROM contents to memory. Where the regions are not shadowed, various windowing mechanisms have been designed using address translation to allow the user to recover memory in these regions.

Additionally, a PC/AT-compatible system typically supports a System Management Mode (SMM). System management mode requires an additional overlaid memory region. In system management mode, a System Management Interrupt, or SMI, may occur to provide access to a protected region of memory, known as SMM memory. The SMM memory is overlaid on top of another memory region.

During normal access to the overlaid region, by the processor 100 or by any bus master, the address cycles go to the ISA bus 122. Then, when an SMI occurs, accesses to this region by the CPU 100 are redirected to the SMM memory. In this way, a region of memory transparent to the operating system and other application programs is available. Further, an SMI handler, residing in this SMM memory location, may be executed. Accesses to SMM memory by bus masters and DMA controller are always sent to the ISA bus 122. Once the SMI handler execution is complete, the SMM memory region is again mapped and further accesses by the processor are directed to the ISA bus 122. Typically, system management mode is implemented in a PC/AT-compatible system for power saving features and for security purposes.

For PC/AT-compatible systems, ROM shadowing is typically a requirement. However, from platform to platform, the mechanism for ROM shadowing is different. Thus, beyond the capability to perform ROM shadowing, there are no further PC/AT requirements.

Because PC/AT-compatible systems can be upgraded, it is important that the BIOS be able to detect and report the amount of memory in the system S each time it is powered on. When the POST is executed in the ROM at power up, a sizing algorithm is executed which attempts to scan the memory array quickly and efficiently to accomplish this task. However, for some types of DRAM, it is difficult to perform this algorithm without first determining its type (fast-page vs. EDO, for example). Thus, in a PC/AT-compatible system, some mechanism is needed to help determine the type of memory populating the system.

Those PC/AT-compatible systems which implement PCI technology have an additional memory requirement.

Because of the tight coupling of a CPU bus to the memory subsystem, the PCI host bridge logic cannot generally access memory address decode logic quickly enough to meet PCI cycle requirements. This situation can be addressed by maintaining a mirror image of the current memory size configuration registers in the PCI host bridge logic. Having this logic in the PCI host bridge permits the targets on the PCI bus to react quickly when a PCI cycle occurs.

Exemplary Implementation

The microcontroller M of the illustrative system provides flexible address mapping. A set of programmable address region, or PAR, registers are provided to configure both physical memory and I/O regions for the microcontroller M. The PAR registers are used to define four characteristics: the target device, attributes for the region, the size of the address region, and the start address for the region. The PAR registers thus provide a flexible mechanism for both memory and I/O space mapping. Embedded system designers may implement the microcontroller M such that the memory space is PC/AT-compatible.

In the microcontroller M, the memory space is used to address the DRAM, the ROM, the PCI bus 82, the general purpose bus 72, and a group of registers known as Memory-Mapped Configuration Region, or MMCR, registers. In the disclosed embodiment, the processor 36 has access to the entire memory space. However, in a disclosed embodiment, only external PCI bus masters and the general purpose bus DMA controller 22 have access to the DRAM space.

Figure 17:
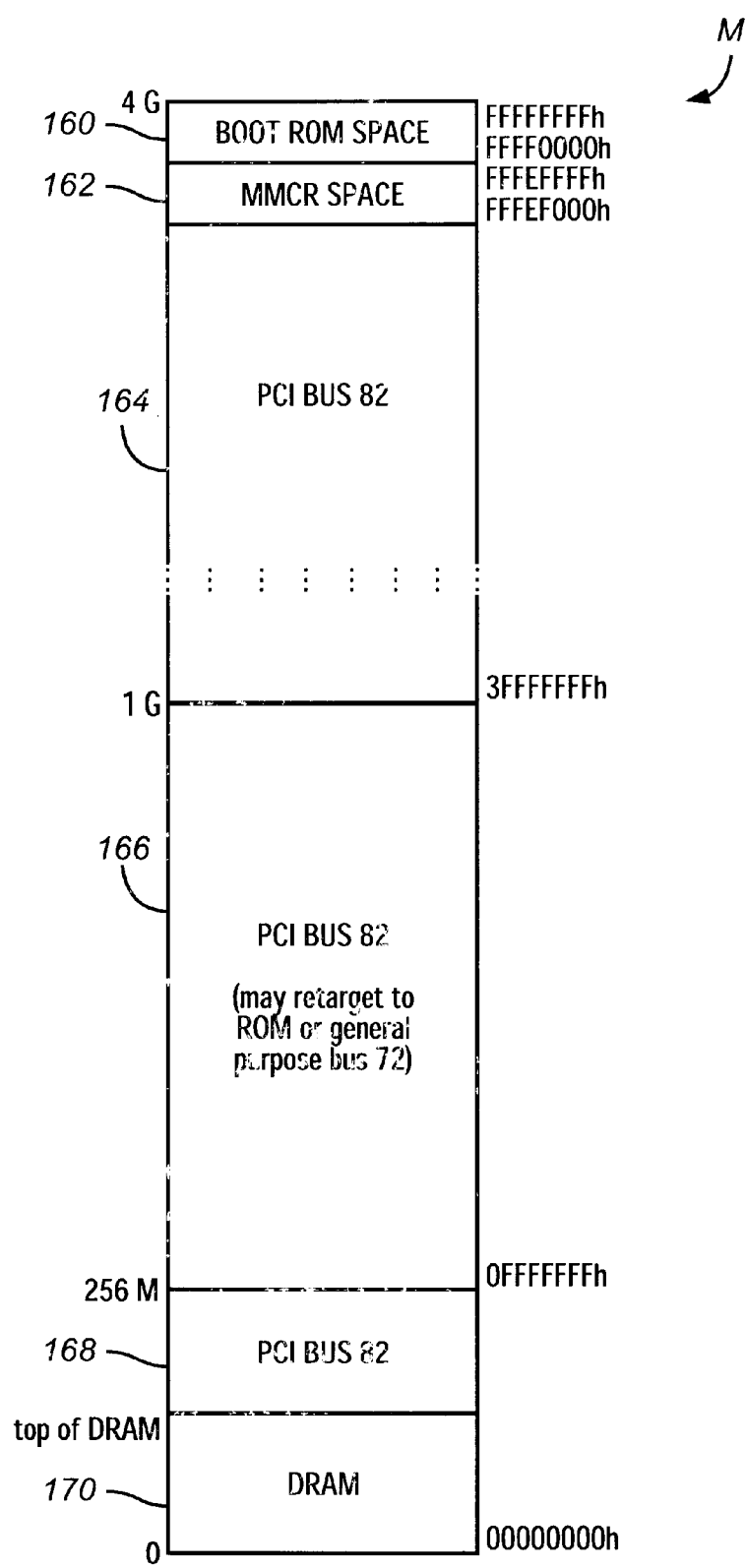
FIG. 17 is a representation of a memory map for an exemplary microcontroller according to one embodiment.

FIG. 17 is an illustration of the system memory map for the microcontroller M, according to one embodiment. The top region 160 is dedicated for a boot ROM space. The microcontroller M actually supports up to three ROM devices. However, the boot ROM space, just below 4G, addresses the boot ROM device which is connected to the BOOTCS signal. Next, region 162 is shown for the memory-mapped configuration region, MMCR, registers. All integrated peripheral devices and configuration registers in the microcontroller M, which are not defined as PCI bus configuration space, PC/AT peripheral configuration registers, or the configuration base address register, are memory-mapped in the MMCR space 162.

Next, the region between 1G and 4G that is not dedicated to either the boot ROM or the MMCR (3FFFFFFFh–FFFEF0000h) is addressed to the PCI bus 82, shown as region 164 in FIG. 17. The region from 256 M to 1G, shown as region 166, contains addresses which go to the PCI bus 82 as well. However, in the latter region 166, the addresses may be re-targeted to the ROM are the general purpose bus 72.

For address 0–0FFFFFFFh, which is a 256M range, the memory map is split into two parts. From 0h to the total amount of DRAM in the system, this region is addressed to DRAM exclusively, shown in FIG. 17 as region 170. The remaining region 168 is dedicated to address the PCI bus 82.

Referring back to FIG. 16, a PC/AT-compatible system includes a memory map where the first 16M is dedicated for DRAM. Thus, an embedded system using the microcontroller M with 16M of memory will have a memory map which is PC/AT-compatible. However, the microcontroller M further provides programmable address region, or PAR, registers for configuring both I/O and memory space regions for an embedded system. The PAR registers are primarily used to define the address regions of ROM and the general purpose bus 72, as well as to set attributes for the ROM and DRAM regions.

For memory sizing, the microcontroller M features a code kit provided to embedded system designers. Among its features, the code kit includes a BIOS memory sizing algorithm. This algorithm may be used to determine size and symmetry of the DRAM during power-up.

Miscellaneous Functions

PC/AT Compatibility Requirements

Beyond the actual peripheral devices already mentioned and the I/O and memory addressing requirements, the PC/AT-compatible system S specifies various control and status ports. Although some systems may not require each of the features below, typical PC hardware supports all of these features for legacy compatibility.

Numeric Coprocessor

Looking back to FIG. 3, the IRQ13 input to the PIC 112 comes from the numeric co-processor 156. A signal, ERROR#, is received from the co-processor 156 when an error condition is encountered while executing an instruction. In a PC/AT-compatible machine, ERROR# is connected to the IRQ13 line. Thus, in a PC/AT-compatible system, a coprocessor error generates an IRQ13 interrupt.

Figure 18:
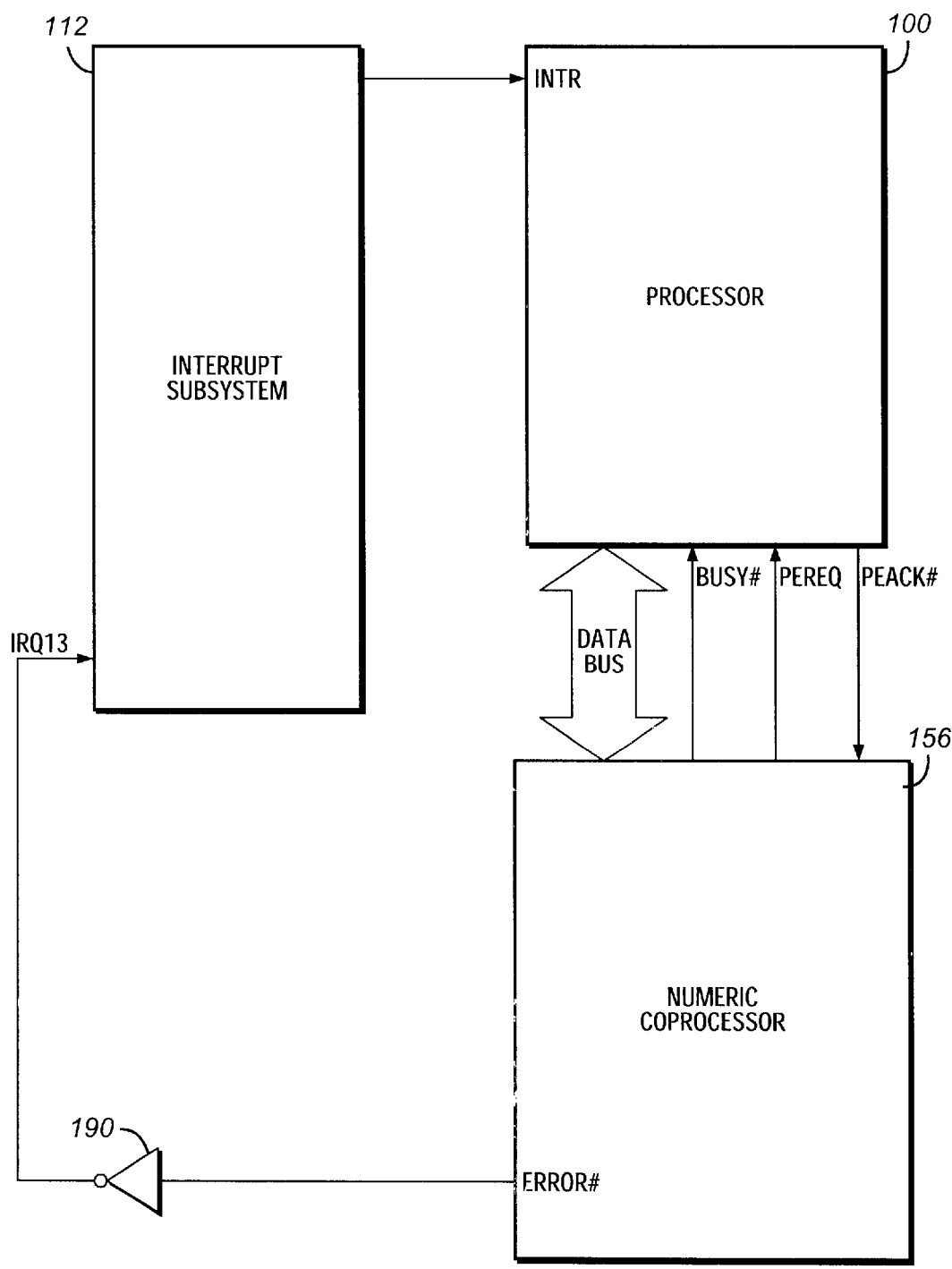
FIG. 18 is a block diagram illustrating the configuration of a numeric coprocessor for a typical PC/AT computer system.

FIG. 18 illustrates the logic in a PC/AT-compatible system. As shown, when the ERRORS signal is asserted low, it passes through an inverter 190 as an active high IRQ13 input to the interrupt subsystem 112. As described above, the interrupt subsystem 112 prioritizes all incoming interrupts, then interrupts the processor 100 accordingly, shown as the INTR input to the processor 100.

As shown in FIG. 18, an interrupt request from the numeric coprocessor 156 is typically routed to IRQ13 of the interrupt subsystem 112. This allows an interrupt handler to write to port 0F0h to clear the interrupt request and force the IGNNE signal of the processor 36 active. This enables execution of floating point instructions within the interrupt handler. Once the FPU error condition is cleared by the handler, the error signal, FERR, of the numeric coprocessor is deasserted and the IGNNE signal is subsequently deasserted. The interrupt request and IGNNE signal are also cleared by a system reset.

Additionally, PC/AT-compatible systems require the decoding of I/O address 0F0h, such that writes to this port reset the IRQ13 interrupt and assert a signal, IGNNE, which essentially tells the processor 100 to ignore the numeric error (from the coprocessor 156). One can refer back to Table 4, above, for typical I/O port assignments for the PC/AT-compatible system S. Further, the logic must be configured such that an inactive edge on a FERRD signal deasserts the IGNNE (ignore numeric error) signal.

Super I/O Controller

The super I/O controller, a multiple function chip, such as the one manufactured by National Semiconductor, of Santa Clara, Calif., supports a floppy disk controller, two UARTs, a keyboard controller, a parallel port interface, and an IDE interface. Because of its PC/AT compatibility, multi-functionality, and low real estate requirement, the super I/O controller is featured in many PC/AT-compatible system boards today.

Hot Reset

The original IBM PC/AT was a 286-based system. 80286 microprocessors may be run in both real mode and protected mode. When an application program runs in protected mode, it may potentially address all of the memory in the system.

When the PC/AT was first introduced, the computer was typically loaded with MS-DOS. MS DOS is a real mode program. Many if not most of the application programs written at the time were designed to run under MS DOS. So, even though the 286 had protected mode capabilities, often the need to return to real mode was necessary.

In order to switch the 80286 microprocessor from protected mode to real mode, the microprocessor must be reset.

Legacy PC/AT systems provide two ways to reset the microprocessor. First, I/O port 064h, which addresses an 8042 or compatible keyboard controller, may be written to, invoking a reset. The keyboard controller in a PC/AT system includes an output signal, known as a "hot reset" signal. A write of 0FEh to I/O port 064h causes the microprocessor to reset. Refer back to Table 4 for typical I/O port assignments for a PC/AT-compatible system.

Later, many legacy PC/AT computers used I/O address 0092h, shown in Table 4 as a system control port A, to issue a hot reset. By setting bit 0 in system control port A, hardware logic in the system quickly resets the microprocessor. This reset is thus sometimes called a "fast hot reset."

The 8042 keyboard controller in a PC/AT-compatible system further includes an output signal, known as "A20 gate." When asserted, "A20 gate" inhibits the generation of address line A20 during real mode operations. When A20 is deasserted, accesses to addresses above 1M are defeated in favor of addresses below 1M, a phenomenon known as "segment wrap-around." The effect is to make 286 and higher microprocessors emulate 8086 and 8088 microprocessors. Like the hot reset, A20 gate is enabled by writing to I/O port 064h.

Exemplary Implementation

The microcontroller M of the illustrative system provides the capability to support the aforementioned miscellaneous functions including NMI capability, support for a numeric coprocessor (including error reporting), support for a super I/O controller providing a multitude of additional PC/AT-compatible peripheral devices, and hot reset and A20 gate support.

Numeric Coprocessor

The microcontroller M supports DOS-compatible floating point error handling via the standard port 0F0h, as in legacy PC/AT systems. As described above, PC/AT systems control floating point error reporting through the interrupt controller rather than through the internal CPU interrupt. The microcontroller M further provides a gate A20 source at I/O address 092h. This is compatible with a typical PC/AT system.

Super I/O Controller

Embedded systems designers may wish to connect a commercially available super I/O chip on the general purpose bus 72 of the microcontroller M. For example, it may be desirable for systems requiring a keyboard to incorporate the super I/O chip. As stated above, the super I/O chip provides controllers for a keyboard, a mouse, two serial ports, a parallel port, a floppy disk, and a fixed disk.

Since the super I/O chip implements two UARTs programmed at the same address as the integrated UARTs 40 of the microcontroller M, the internal UARTs 40 maybe disabled to support the UARTs in the super I/O chip if desired. In this case, when the processor 36 performs I/O access to the UART address regions, the cycles are forwarded to the external general purpose bus 72.

Figure 19:
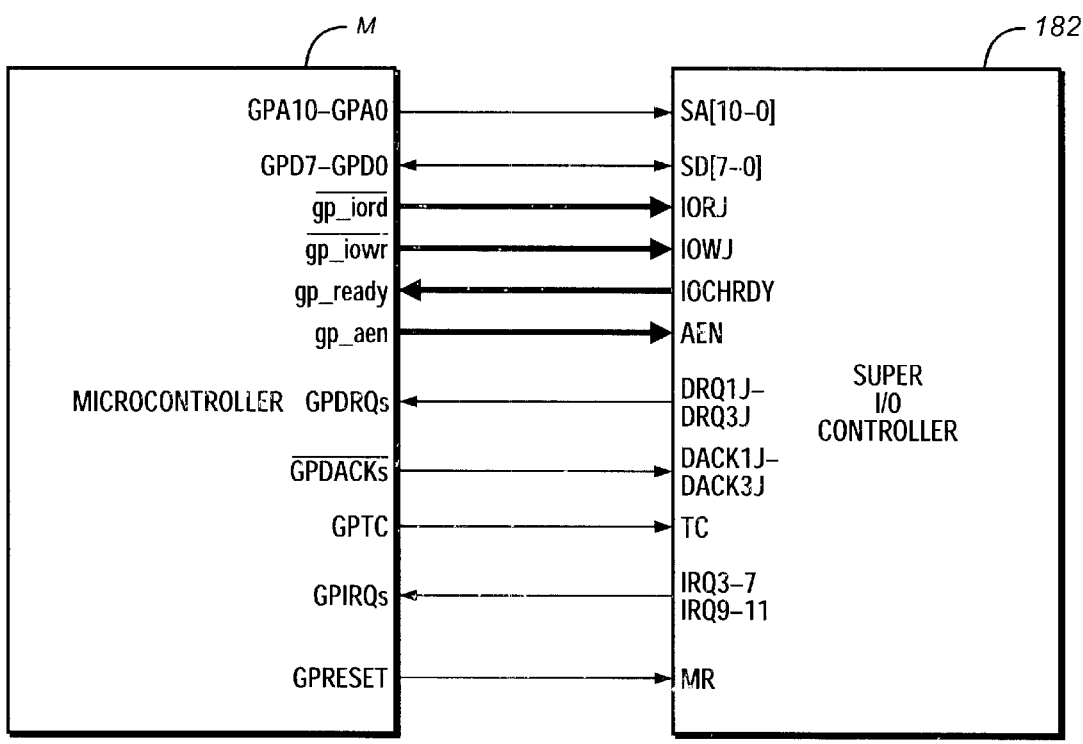
FIG. 19 is a block diagram of an embedded system featuring an exemplary microcontroller coupled to a Super I/O controller according to one embodiment.

FIG. 19 shows a block diagram of the microcontroller M interfacing with a super I/O controller 182. The general purpose bus controller 24 of the microcontroller M supports programmable bus interface timing. Accordingly, the general purpose bus maybe programmed to optimally support the super I/O controller 182. More discussion of the general purpose bus and its ability to support the super I/O controller 182 may be found in commonly assigned U.S. patent application, entitled "GENERAL PURPOSE BUS WITH PROGRAMMABLE TIMING," previously incorporated herein by reference.

While conventional microcontrollers designed for PC applications have typically integrated a number of I/O functions, the microcontroller M effectively gains many I/O functions by leveraging the capabilities of super I/O chip. Further, the ease with which the super I/O chip may be coupled to the microcontroller M makes using the super I/O chip a natural choice for embedded system designers who desire these features. Thus, the architecture of the microcontroller M is unfettered by the need to integrate a floppy controller, a keyboard controller, and other PC/AT-compatible peripheral logic internally.

Hot Reset

The microcontroller M further supports the hot reset feature of PC/AT compatible system S. By writing a value of 0FEh to I/O port 064h, the processor 36 of the microcontroller M is reset. Alternatively, setting bit zero of the system control port A, at I/O address 092h, also causes a reset of the processor 36. Following this reset, bit zero remains set until software clears it. This feature indicates to the software that a port 92 h write was used to generate the reset.

Thus, a flexible microcontroller with the capability to provide a PC/AT-compatible or embedded non-PC/AT-compatible environment is disclosed. The microcontroller includes a general purpose bus which may emulate an ISA bus. Multiple programmable interrupt controllers, operable in both PC/AT-compatible and non-PC/AT-compatible modes, are featured. Also provided are PC/AT-compatible DMA, programmable timers, and a real-time clock, a flexible I/O mapping scheme, and programmable address mapping. The microcontroller also provides processor reset functions which are PC/AT-compatible as well as system control ports A and B, NMI generation, A20 gate commands and DOS-compatible FPU error reporting. The microcontroller further provides a dedicated pin for connection to an external clock if desired.

The foregoing disclosure and description of the various embodiments are illustrative and explanatory thereof, and various changes in the descriptions of the microcontroller and other circuitry, the organization of the components, and the order and timing of steps taken, as well as in the details of the illustrated system may be made without departing from the spirit of the invention.

What is claimed is:

1. A flexible PC/AT-compatible microcontroller, comprising:
   an 8088-compatible processor;
   a processor bus coupled to the 8088-compatible processor;
   a general purpose bus controller coupled to the processor bus;
   a general purpose bus coupled to the general purpose bus controller, the general purpose bus emulating an industry standard architecture-compatible bus in a PC/AT-compatible mode;
   a plurality of PC/AT peripheral devices coupled to the general purpose bus; and
   a plurality of programmable interrupt controllers coupled to the general purpose bus to provide a plurality of interrupt request lines for the plurality of PC/AT peripheral devices, a first set of programmable interrupt controllers of the plurality of programmable interrupt controllers being disabled in a PC/AT-compatible mode and a second set of programmable interrupt controllers of the plurality of programmable interrupt controllers being enabled in a PC/AT-compatible mode.

2. The microcontroller of claim 1, further comprising:
   an interrupt control register to selectively enable and disable programmable interrupt controllers of the plurality of programmable interrupt controllers in a PC/AT-compatible mode.

3. The microcontroller of claim 1, further comprising:

a plurality of programmable address registers to map the plurality of PC/AT peripheral devices to a set of address configurations in a PC/AT-compatible mode.

4. The microcontroller of claim 1, further comprising:

a plurality of timers including an 8254-compatible programmable interval timer to supply a PC/AT-compatible count pulse rate in a PC/AT-compatible mode.

5. The microcontroller of claim 4, the plurality of timers comprising:

a plurality of non-PC/AT-compatible timers, including a watchdog timer, a software timer, and a plurality of general purpose timers.

6. The microcontroller of claim 1, wherein only a master programmable interrupt controller and a slave programmable interrupt controller of the plurality of programmable interrupt controllers are enabled in a PC/AT-compatible mode.

7. The microcontroller of claim 1, wherein the plurality of programmable interrupt controllers comprise 8259-compatible programmable interrupt controllers.

8. The microcontroller of claim 1, further comprising:

a plurality of direct memory access controllers coupled to the general purpose bus including 8237-compatible direct memory access controllers to handle fly-by direct memory access transfers.

9. The microcontroller of claim 8, wherein each direct memory access controller of the plurality of direct memory access controllers provides three 16-bit channels and four 8-bit channels.

10. The microcontroller of claim 1, further comprising:

a MC146818-compatible real-time clock coupled to the general purpose bus.

11. The microcontroller of claim 1, the plurality of programmable interrupt controllers comprising:

a non-maskable interrupt enable bit of an interrupt control register to enable a non-maskable interrupt signal in a PC/AT-compatible mode.

12. The microcontroller of claim 1, further comprising:

an input/output address space with a dedicated region for the plurality of PC/AT peripheral devices.

13. The microcontroller of claim 1, the plurality of programmable interrupt controllers comprising:

a master programmable interrupt controller and first slave programmable interrupt controller enabled in the PC/AT-compatible mode and a non-PC/AT-compatible mode; and a second slave programmable interrupt controller disabled in the PC/AT-compatible mode and enabled in the non-PC/AT-compatible mode.

14. A method of configuring a microcontroller for PC/AT compatibility, the microcontroller including a bus, a plurality of programmable interrupt controllers coupled to the bus, and a plurality of PC/AT peripheral devices coupled to the bus, the method comprising the steps of:

configuring the bus to emulate an industry standard architecture-compatible bus; and configuring the plurality of programmable interrupt controllers coupled to the bus to enable a master programmable interrupt controller and a slave programmable interrupt controller and to disable other programmable interrupt controllers of the plurality of programmable interrupt controllers.

15. The method of claim 14, the microcontroller including a direct memory access controller having a PC/AT-compatible mode and a non-PC/AT-compatible mode, the method further comprising the step of:

configuring the direct memory access controller for the PC/AT-compatible mode.

16. The method of claim 14, further comprising the step of:

configuring the microcontroller for connection to a super I/O controller.

17. A flexible PC/AT-compatible microcontroller, comprising:

an 8088-compatible processor;

a processor bus coupled to the 8088-compatible processor;

a general purpose bus;

a general purpose bus controller coupled between the processor bus and the general purpose bus, the general purpose bus controller, comprising:

a means for configuring the general purpose bus to emulate an industry standard architecture-compatible bus;

a plurality of PC/AT peripheral devices;

a plurality of programmable interrupt controllers coupled to the general purpose bus and the plurality of PC/AT peripheral devices, the plurality of programmable interrupt controllers comprising:

a means for configuring a first set of programmable interrupt controllers of the plurality of programmable interrupt controllers to be enabled and a second set of programmable interrupt controllers of the plurality of programmable interrupt controllers to be disabled.

18. The microcontroller of claim 17, the plurality of programmable interrupt controllers comprising:

a means to enable a non-maskable interrupt signal.

* * * * *